US011259209B2

(12) United States Patent
Naik et al.

(10) Patent No.: US 11,259,209 B2
(45) Date of Patent: Feb. 22, 2022

(54) SYSTEM AND METHOD FOR DYNAMICALLY SWITCHING TRANSMISSION OF DATA FROM CELLULAR TO UNIDIRECTIONAL POINT-TO-MULTIPOINT NETWORK

(71) Applicant: Saankhya Labs Pvt. Ltd., Bangalore (IN)

(72) Inventors: Parag Naik, Bangalore (IN); Arindam Chakraborty, Bangalore (IN); Makarand Kulkarni, Bangalore (IN); Anindya Saha, Bangalore (IN); Vishwakumara Kayargadde, Bangalore (IN); Mark Andrew Aitken, Parkton, MD (US)

(73) Assignee: Saankhya Labs Pvt. Ltd., Bangalore (IN)

( * ) Notice: Subject to any disclaimer, the term of this patent is extended or adjusted under 35 U.S.C. 154(b) by 0 days.

(21) Appl. No.: 16/620,518

(22) PCT Filed: Sep. 12, 2019

(86) PCT No.: PCT/IN2019/050661
§ 371 (c)(1),
(2) Date: Dec. 8, 2019

(87) PCT Pub. No.: WO2020/053889
PCT Pub. Date: Mar. 19, 2020

(65) Prior Publication Data
US 2021/0345165 A1 Nov. 4, 2021

(30) Foreign Application Priority Data
Sep. 12, 2018 (IN) .............................. 201841034480

(51) Int. Cl.
*H04W 28/02* (2009.01)
*H04W 28/08* (2009.01)
*H04W 36/22* (2009.01)

(52) U.S. Cl.
CPC ... *H04W 28/0289* (2013.01); *H04W 28/0842* (2020.05); *H04W 36/22* (2013.01)

(58) Field of Classification Search
CPC ......... H04W 28/0289; H04W 28/0842; H04W 36/22; H04W 28/0804; H04W 28/0808; H04W 28/08; H04W 48/18
See application file for complete search history.

(56) References Cited

U.S. PATENT DOCUMENTS

2017/0048739 A1* 2/2017 Jeong ...................... H04W 4/70
2017/0208499 A1* 7/2017 Ishii ...................... H04W 28/08

* cited by examiner

*Primary Examiner* — Pao Sinkantarakorn
*Assistant Examiner* — Kabir U Jahangir

(57) ABSTRACT

A system and method for dynamically switching transmission of selected data from cellular core network to unidirectional point-to-multipoint downlink network or from unidirectional point-to-multipoint downlink network to cellular core network based on traffic flow analysis is provided. The system includes a cellular packet core 206, a broadcast offload packet core (BO-PC) 302, and a load manager 202. The cellular packet core 206 controls a cellular radio access network (RAN) 412 for providing bidirectional connectivity to a converged user equipment (UE) (204) to transmit or receive selected data through the cellular packet core 206 and the RAN 412. The BO-PC 302 controls a broadcast radio access network (RAN). The broadcast radio access network (RAN) includes at least one Broadcast Radio Head (BRH) 322 for providing unidirectional downlink path to the converged user equipment (UE) 204 to receive selected data through the at least one Broadcast Radio Heads (BRH) 322.

32 Claims, 18 Drawing Sheets

SYSTEM AND METHOD FOR DYNAMICALLY SWITCHING TRANSMISSION OF DATA FROM CELLULAR TO UNIDIRECTIONAL POINT-TO-MULTIPOINT NETWORK

CROSS-REFERENCE TO RELATED APPLICATIONS

This application claims priority to Indian provisional patent application no. 201841034480 filed on Sep. 12, 2018, the complete disclosure of which, in its entirely, is herein incorporated by reference.

BACKGROUND

Technical Field

The embodiments herein generally relate to a broadband network, and more particularly, to a system and method for dynamically switching transmission of selected data from a cellular core network to a unidirectional point-to-multipoint downlink network based on a traffic flow analysis.

Description of the Related Art

Mobile data offloading is the use of complementary network technologies for delivering data originally targeted for cellular networks. Offloading reduces the amount of data being carried on the cellular bands, freeing bandwidth for other users. It is also used in situations where local cell reception may be poor, allowing the user to connect via alternate wireless or wired services with better connectivity.

There is an increasing need for offloading solutions due to explosion of Internet data traffic, especially the growing portion of traffic going through mobile networks. This has been enabled by smartphone devices together with higher resolution screens and different Internet applications, from browsers to video and audio streaming applications. A particular issue is that of the ever-increasing video traffic, which not only requires high bandwidth, but also high quality of service (QoS) in terms of latency and jitter. Widely viewed content streamed over unicast networks such as live sports and news events can cause severe congestion in cellular networks. With the advent of Over the Top (OTT) content, cellular broadband services are facing a major challenge, compounded by the fact that users are moving from conventional televisions to personal mobile devices. Although Wi-Fi is currently the preferred offload mechanism, it is not the best solution for video and high QoS demanding services since the downlink competes with uplink for transmission resources (frequency bands and time slots). Also, maintaining QoS in Wi-Fi network is more challenging, as compared to a cellular or a broadcast network. Recognizing the fact that a Broadcast network is the best method of providing video download, 3rd Generation Partnership Project (3GPP) has incorporated "evolved Mobile Broadcast Multicast Service (eMBMS)". This is explained in published paper titled "Broadcast and Multicast Communication Enablers for the Fifth-Generation of Wireless Systems" on Jun. 29, 2018 (http://5g-xcast.eu/wp-content/uploads/2019/04/5G-Xcast_D3.1_v1.1_web.pdf) where it is reported that the spectral efficiency of Broadcast Standards is superior compared to eMBMS.

However, the eMBMS service works only for Linear TV and shares the same spectral resources as the cellular traffic. Hence it does not solve the congestion problem in general, only providing minor relief for a very few widely viewed contents. In addition, the unicast PHY from 3GPP in LTE is not suited for Video delivery due to conflicting QoS requirements. Video traffic can tolerate higher latency for better Doppler management.

In most locations, there is a large chunk of spectrum lying under-utilized in the very high frequency/ultra-high frequency (VHF/UHF) bands originally conceived for TV transmission. VHF/UHF frequencies have much better propagation characteristics as compared to cellular bands especially in dense urban conditions.

In most geographies, Terrestrial Broadcasters have an exclusive right over the VHF/UHF frequencies. While growth in terrestrial TV transmission is almost stagnant, better compression technologies incorporated by the advanced digital TV standards has reduced the quantum of spectrum required by broadcasters to provide television services. This has led to increase of spare bandwidth available for other applications in the VHF/UHF bands.

Extending network reach over large geographies is a challenge as it is not economical to deploy and maintain an Optical Fiber links in remote places. Usually low-cost point to-point radio links over unlicensed spectrum is used for backhauling, but this is bandwidth constrained. A hierarchical backhaul telecommunication network, often requires multiple hops which makes it difficult to guarantee QoS due to queueing at each node. A satellite communication based backhaul will have a single hop to each node, thus having improved QoS but suffers from higher cost and relatively lower bandwidths.

Accordingly, there remains a need for a system and method for dynamically switching transmission of selected data from a cellular core network to a unidirectional point-to-multipoint downlink network based on a traffic flow analysis.

SUMMARY

In view of the foregoing, embodiments herein provide a system for dynamically switching transmission of selected data from a cellular core network to a unidirectional point-to-multipoint downlink network or from the unidirectional point-to-multipoint downlink network to the cellular core network based on a traffic flow analysis. The system includes a cellular packet core, a Broadcast offload packet core (BO-PC), and a load manager. The cellular packet core controls a cellular radio access network (RAN) for providing a bidirectional connectivity to a converged user equipment (UE) to transmit or receive the selected data through the cellular packet core and the cellular radio access network (RAN). The Broadcast offload packet core (BO-PC) controls a broadcast radio access network (RAN). The broadcast radio access network (RAN) includes at least one Broadcast Radio Head (BRH) for providing a unidirectional downlink path to the converged user equipment (UE) to receive the selected data through the at least one Broadcast Radio Head (BRH). The Broadcast Offload-Packet Core (BO-PC) includes an analytics engine. The analytics engine is configured to gather traffic flow data from at least one of (i) the cellular packet core, or (ii) the converged user equipment (UE). The converged user equipment (UE) is an enhanced user equipment. The converged user equipment (UE) is configured to receive contents from a cellular network or contents from a unidirectional downlink path through the Broadcast Offload Packet Core (BO-PC). The at least one Broadcast Radio Head (BRH) is configured to transmit the selected data from the broadcast radio access network (RAN) to the converged user equipment (UE). The load manager is configured to monitor a nature of service required by the converged user equipment (UE). The load manager controls the traffic flow through at least one of the (i) the cellular network or (ii) the unidirectional downlink path based on a data analysis carried out by the analytics engine. The analytics engine analyzes a set of metrics gathered from at least one of (i) the cellular packet core and (ii) the cellular radio access network (RAN). The load manager switches services required by the converged user equipment (UE) from the cellular packet core to the broadcast offload packet core) or from the broadcast offload packet core to the cellular packet core based on an input provided by the analytics engine. The load manager decides whether to switch the transmission of the selected data from at least one of (i) a downlink traffic of the cellular packet core to a unidirectional downlink of the Broadcast Offload Packet Core (BO-PC) or (ii) the unidirectional downlink of the Broadcast Offload Packet Core (BO-PC) to the downlink traffic of the cellular packet core based on an analysis result suggested by the analytics engine.

In some embodiments, the broadcast offload packet core (BO-PC) includes a Subscriber (SUBS) database, a Broadcast Offload Service Centre (BO-SC), and a Broadcast Offload Gateway (BO-GW). The Subscriber (SUBS) database includes a user information that is determined by a unique identity of the converged user equipment (UE) to extract the selected data from the traffic flow data between the cellular packet core and the converged user equipment (UE).

In some embodiments, the Broadcast Offload Service Centre (BO-SC) schedules the traffic flow to be transmitted over the unidirectional downlink for all BRHs under the Broadcast Offload Service Center (BO-SC) control. In some embodiments, the Broadcast Offload Service Center (BO-SC) performs Robust Header Compression (RoHC), and a data encryption on a per stream basis of the selected data.

In some embodiments, the Broadcast Offload Gateway (BO-GW) is configured to interface to a legacy IP Backhaul network to connect all the Broadcast Radio Heads (BRHs) through a unicast link or multicast links. The Broadcast Offload Gateway (BO-GW) tunnels a header compressed IP packets over the IP backhaul network destined to a target Broadcast Radio Head (BRH). In some embodiments, the legacy IP Backhaul network is configured from an Element Management System (EMS).

In some embodiments, the legacy IP backhaul network connects at least one of (i) cellular base stations, (ii) the at least one broadcast radio head (BRH), and (iii) a satellite head-end.

In some embodiments, the legacy IP Backhaul network provides a "Layer 2 Virtual Private Network (L2-VPN)" service to broadcast traffic and a L2 Tunnel service for a unicast traffic. In some embodiments, the L2 tunnels are semi-permanent point-to-point paths that are created between the BO-GW and individual Broadcast Radio Heads (BRHs).

In some embodiments, if a new IP stream is added to the broadcast network, the at least one BRH initiates an "Internet Group Management Protocol (IGMP)" request. In some embodiments, the legacy IP Backhaul network adds the new IP stream to multicast within the L2-VPN using IGMP snooping.

In some embodiments, the BO-GW look-ups for an address of the L2 tunnels and VLAN tag and forwards a frame to a corresponding L2 tunnel or L2 VPN based on a destination IP address of the at least one BRH.

In some embodiments, the at least one Broadcast Radio Head (BRH) or a plurality of Broadcast Radio Heads (BRHs) caters to a broadcast traffic by operating as a single frequency network (SFN) or a multi frequency network (MFN) and caters to unicast traffic by operating as a supplementary downlink (SDL). In some embodiments, a network architecture that changes from the single frequency network (SFN) or the multi frequency network (MFN) or the supplementary downlink is based on a set of conditions that is decided by the analytics engine.

In some embodiments, the at least one Broadcast Radio Head (BRH) includes an RF sniffing functionality that monitors radio environment that comprises neighbor cell information, unwanted interferers, and cellular network congestion.

In some embodiments, the system includes a satellite link that acts as a backhaul link for the at least one Broadcast Radio Head (BRH).

In some embodiments, the converged user equipment (UE) includes at least one of (i) a broadcast receiver, or (ii) a satellite receiver to receive a unidirectional downlink signal, and a generic cellular modem functionality.

In some embodiments, the set of metrics includes (i) a traffic flow rate, (ii) a level of congestion in the cellular packet core and the cellular radio access network (RAN), (iii) a throughput of a cellular connectivity, (iv) packet jitter, (v) channel occupancy in the unidirectional downlink, and (vi) pre-decided policy metrics.

In some embodiments, the level of congestion is estimated from sizes of transmit buffer queues in a cellular base station obtained from at least one of (i) an Element Management System (EMS) that controls and monitors the cellular base stations or (ii) indirectly derived from the converged user equipment (UE) by measuring an elapsed time between a first scheduling request and an actual data transfer.

In some embodiments, the converged user equipment (UE) is capable of estimating a traffic intensity at a geographical region by performing measurements of the elapsed time between the first scheduling request and the actual data transfer in a cellular modem.

In some embodiments, the load manager generates a "table of contents" for broadcast streams and is made available to the converged UE. In some embodiments, if the converged UE identifies a desired content in the "table of contents", the converged UE starts consuming the desired content and notifies the consumed content to the load manager over a cellular uplink. In some embodiments, the analytics engine and a Content Distribution Network (CDN) are made aware of consumption and add information of the consumed content to a database.

In some embodiments, the converged UE includes an SDR receiver that monitors cellular signals. In some embodiments, an insight into network congestion in the cellular network is obtained by detecting frequency of a schedule request for transmitting a given chunk of data, and frequency of negative acknowledgements (NACK) for a cellular downlink signal request. In some embodiments, the network congestion information is communicated to the analytics engine.

In some embodiments, the Broadcast Offload Packet Core (BO-PC) interfaces with a Gateway Mobile Location Centre (GMLC) to obtain a location information of the converged user equipment (UE) to provide a handoff mechanism when the unidirectional downlink is used for a unicast traffic.

In some embodiments, the analytics engine includes a radio environment database. In some embodiments, the radio environment database includes a data on a geographical location, latitude, longitude, and various radio frequency RF parameters. In some embodiments, the various radio frequency RF parameters includes reference signal levels, noise and interference levels, traffic patterns, which quantifies coverage and a quality of service at given locations.

In some embodiments, the analytics engine performs traffic pattern analysis on the traffic flow data and determines the traffic that is suitable to be sent over the unidirectional downlink or the cellular network.

In some embodiments, the analytics engine selects contents and streams to be sent via the unidirectional downlink as a unicast or multicast or a broadcast mode of delivery.

In some embodiments, the load manager includes a number of dynamic threads and the load manager is configured to (i) poll for user sessions and analyze each user session to determine whether a user session is a new user session or an existing user session, (ii) generate a thread on addition of the new user session originating from at least one converged user equipment (UE), (iii) determine whether the existing user session is terminated. In some embodiments, if the existing user session is terminated then kill threads corresponding to terminated user sessions to free up computational and storage resources.

In some embodiments, the load manager (i) generates a thread for a session, (ii) queries the analytics engine to determine best means to connect in a downlink, (iii) determines if the traffic is scheduled on cellular or unidirectional downlink, (iv) performs a deep inspection of RTP timestamps to measure latency and jitter in the cellular network and (v) configures the BO-SC for the broadcast or the unicast and initiates switch over to the unidirectional downlink. In some embodiments, the load manager queries a location of the converged UE for a session specific thread.

In some embodiments, the load manager interacts with a Content Distribution Network or a Content Delivery Network (CDN) to pull or push a content.

In some embodiments, the Broadcast Offload Packet Core (BO-PC) is a part of 2G, 3G, WiFi, 4G, and 5G networks.

In some embodiments, the at least one Broadcast Radio Head (BRH) dynamically switches from a single frequency network (SFN) to a multiple frequency network (MFN) or from the multiple frequency network (MFN) to the single frequency network (SFN) based on a demographic distribution.

In some embodiments, the at least one Broadcast Radio Head (BRH) in a first region is configured to operate in a Single Frequency Network (SFN) or Multi Frequency Network (MFN) mode and the at least one Broadcast Radio Head (BRH) in a second region is configured to concurrently operate in a unicast mode, based on a decision determined by the load manager and the analytics engine.

In one aspect, a method for dynamically switching transmission of selected data from a cellular core network to a unidirectional point-to-multipoint downlink network or from the unidirectional point-to-multipoint downlink network to the cellular core network based on a traffic flow analysis is provided. The method includes (a) providing, by a cellular packet core and a cellular radio access network (RAN), a bidirectional connectivity to a converged user equipment (UE) to transmit or receive the selected data through the cellular packet core and the cellular radio access network (RAN), (b) providing, by a Broadcast offload packet core (BO-PC) and a broadcast radio access network (RAN), a unidirectional path to the converged user equipment (UE) to receive the selected data through at least one Broadcast Radio Head (BRH), (c) monitoring, using a load manager a nature of service required by the converged user equipment (UE), (d) controlling, using the load manager a traffic flow through at least one of the (i) the cellular network or (ii) the unidirectional downlink path based on a data analysis carried out by the analytics engine, (e) analyzing, using the analytics engine, a set of metrics gathered from at least one of (i) the cellular packet core, or (ii) the cellular radio access network (RAN), and (f) switching, by the load manager, the services required by the converged user equipment (UE) from the cellular packet core to the broadcast offload packet core or from the broadcast offload packet core to the cellular packet core based on an input provided by the analytics engine The Broadcast offload packet core (BO-PC) includes an analytics engine. The analytics engine is configured to gather a traffic flow data from at least one of (i) the cellular packet core, or (ii) a converged user equipment (UE). The converged user equipment (UE) is an enhanced user equipment that is configured to receive contents from a cellular network or contents from the unidirectional downlink path through the Broadcast offload packet core (BO-PC).

The at least one Broadcast Radio Head (BRH) is configured to transmit the selected data from the broadcast radio access network (RAN) to the converged user equipment (UE). The load manager decides whether to switch the transmission of the selected data from at least one of (i) a downlink traffic of the cellular packet core to a unidirectional downlink of the Broadcast Offload Packet Core (BO-PC) or (ii) the unidirectional downlink of the broadcast offload packet core to the downlink traffic of the cellular packet core based on an analysis result suggested by the analytics engine.

In some embodiments, the method includes interfacing the broadcast offload packet core (BO-PC) with a Gateway Mobile Location Centre (GMLC) to obtain location information of the converged user equipment (UE) to provide a handoff mechanism when the unidirectional downlink is used for a unicast traffic.

In some embodiments, the method includes estimating a level of congestion from sizes of transmit buffer queues in a cellular base station obtained from at least one of (i) an Element Management System (EMS) that controls and monitors the cellular base stations or (ii) indirectly inferred from the converged user equipment (UE) by measuring an elapsed time between a first scheduling request and an actual data transfer.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
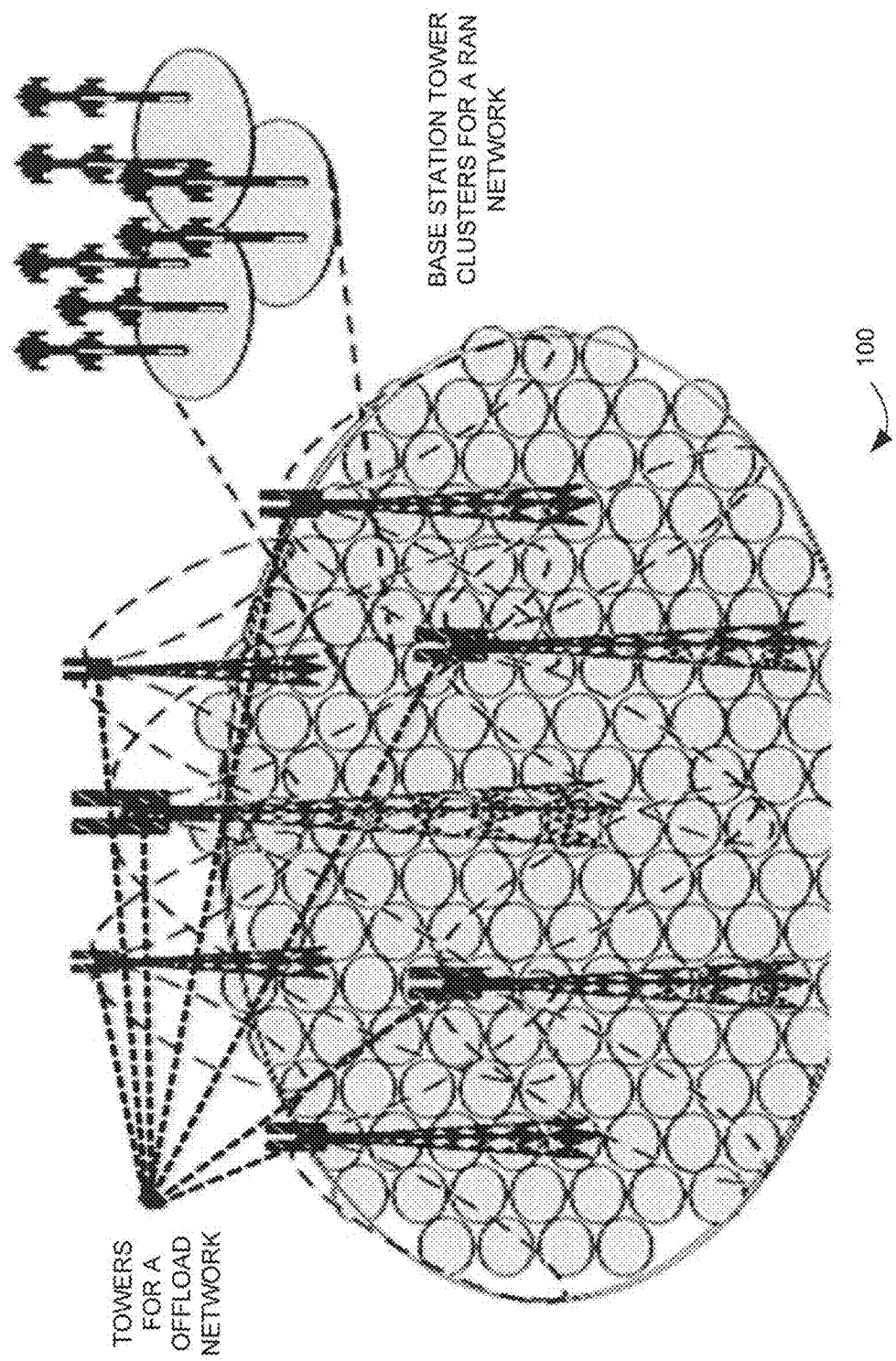
FIG. 1 illustrates a very high frequency/ultra-high frequency (VHF/UHF) digital terrestrial network as an overlay on an existing cellular network according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for incorporating a unidirectional point to multipoint channel or channels to a cellular or a public Wi-Fi network for enhanced capacity and coverage, in addition to incorporating a mechanism of handling broadcast traffic and unicast traffic. The embodiments herein achieve this by using a unidirectional point to multipoint communication link directed from the core network towards a user terminal, capable of being dynamically partitioned into a broadcast network and a unicast network for offloading the cellular network traffic of a wide range of QoS classes. In case of a broadcast network, the common content is transmitted by all the Broadcast Radio Heads (BRHs) in a time aligned manner to take advantage of the concept of Single Frequency Network (SFN), while in the case of unicast, the data is transmitted by a select number of BRHs. The SFN based broadcast network is highly suitable for distribution of terrestrial linear TV. The high Signal to Interference Noise Ratio (SINR) in SFN network enables use of higher modulation and coding which can transport high data rate streams.

To improve the reception of unicast signals in the cell boundaries, the same contents can be transmitted synchronously by those BRHs in close proximity to the UE. Thus, the UE receiver will view the signals as reinforcing instead of interfering. To support unicast to a mobile user (UE) full mobility is provided similar to that in cellular networks. This involves a handoff mechanism when the user moves across different cells. Referring now to the drawings, and more particularly to FIGS. 1 through 14, where similar reference characters denote corresponding features consistently throughout the figures, there are shown preferred embodiments.

FIG. 1 illustrates a very high frequency/ultra-high frequency (VHF/UHF) digital terrestrial network 100 as an overlay on an existing cellular network according to some embodiments herein. The VHF/UHF digital terrestrial network 100 includes a combination of a High-Power High Tower (HPHT) or a Low-Power Low Tower (LPLT) or a Medium-Power Medium Tower (MPMT) transmitter along with a number of the Low Power Low Tower (LPLT) towers deployed in a manner similar to a cellular network. The FIG. 1 depicts towers for a unidirectional downlink network operating in a VHF/UHF range that are capable of servicing at least one of broadcast services and unicast services. In some embodiments, offload towers include one or more configurations such as the High-Power High Tower (HPHT), the Low Power Low Tower (LPLT) or the Medium Power Medium Tower (MPMT) based on terrain to be covered and a desired coverage. In some embodiments, a unidirectional downlink tower may have coverage that extend over single or multiple cells of the cellular network. In some embodiments, network planning for a unidirectional downlink transmitter is different from a conventional cellular planning since it is not constrained by link budget of an uplink path. The VHF/UHF digital terrestrial network 100 caters to a generic transmission infrastructure including very low power small cell such as indoor transmitters. For a broadcast application, same content is transmitted in a time aligned fashion using suitable modulation schemes, e.g. an Orthogonal Frequency Division Multiplexing (OFDM). In some embodiments, "Symbols" received at a User Equipment (UE) is an overlap of all the transmissions from the towers which creates a Single Frequency Network (SFN). Due to the overlap of all the transmissions from the towers, a "Signal to Interference and Noise Ratio (SINR)" of a signal may be consistently greater than a desired threshold value across the unidirectional downlink network. The overlap of all the transmissions from the towers is contrast to the cellular networks, where the SINR degrades significantly at a cell edge when a frequency re-use factor is one. A desired threshold value of the SINR is arrived at to guarantee a minimum desired data throughput across the SFN.

Similar to the broadcast, the unicast traffic is offloaded to the unidirectional downlink network. In some embodiments, the SFN includes limited benefits in case of a unicast offload. In such cases, a best suited Broadcast Radio Heads (BRHs) used for carrying unicast offload data may transmit a signal to allow re-use of bandwidth by other Broadcast Radio Heads (BRHs). In the unicast offload, when the user equipment (UE) is located in a region where the received signal from the Broadcast Radio Heads (BRHs) that are of similar strengths, the same content is synchronously transmitted from all of them, which may improve coverage and mitigate interference, at a slight cost of frequency reuse. More generically, the unidirectional downlink network is partitioned into multiple clusters, where coordinated downlink is implemented involving a pool of the Broadcast Radio Heads (BRHs).

Though the overlay mechanism described earlier operates in the VHF/UHF frequency range, the unidirectional downlink network concept is extensible to any frequency band or spectrum and can work with any future broadcast technologies.

Figure 2:
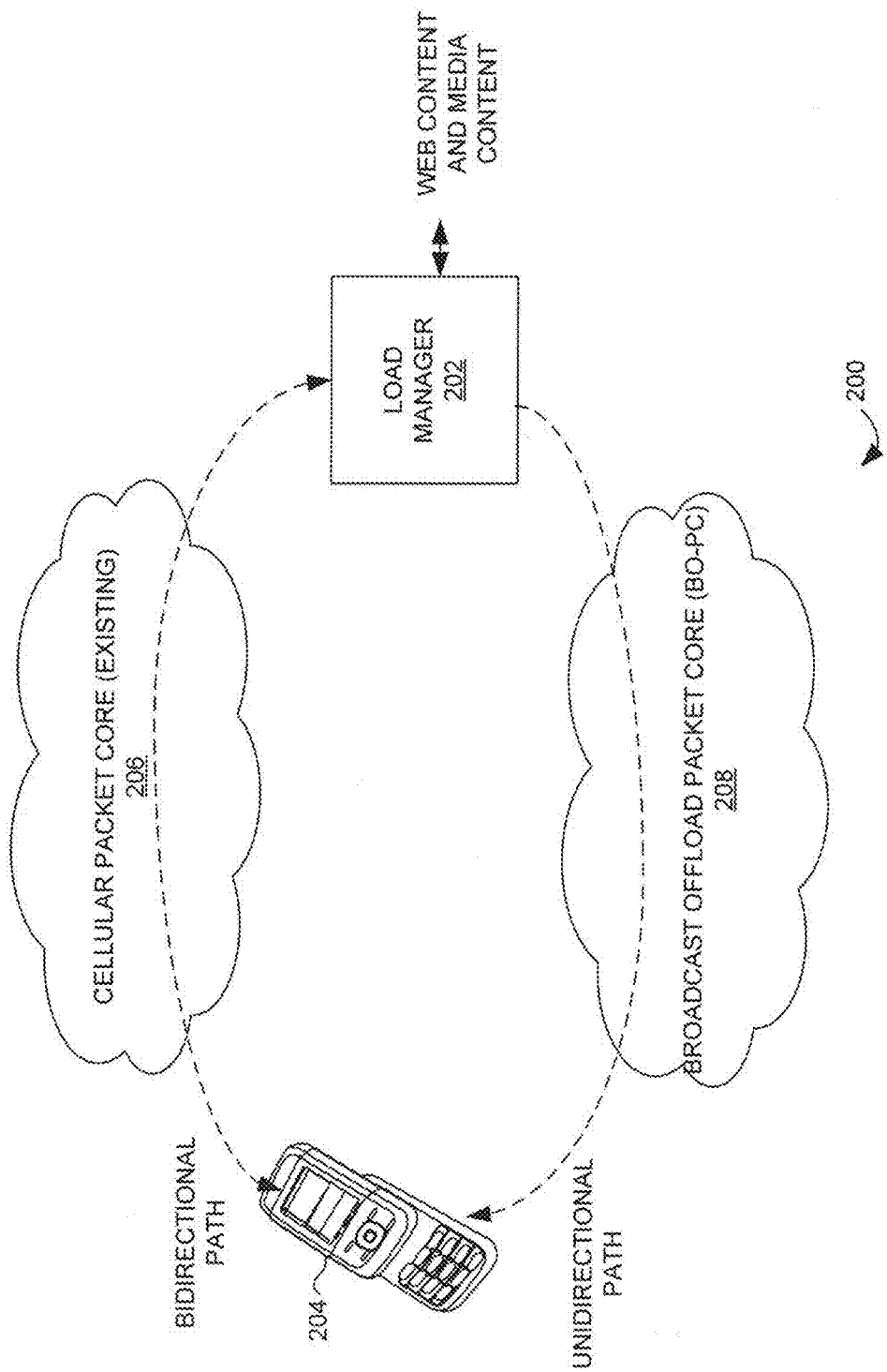
FIG. 2 is a block diagram that illustrates a service addressed by a converged core network according to some embodiments herein.

FIG. 2 is a block diagram 200 that illustrates a service addressed by a converged core network according to some embodiments herein. The block diagram 200 includes a Load manager 202, a converged user equipment (UE) 204, a cellular packet core 206 and a Broadcast offload packet core (BO-PC) 208. In some embodiments, the load manager 202 acts as a proxy server for the converged UE 204. In some embodiments, each session created on the converged UE 204 may be intermediately terminated at the load manager 202. In some embodiments, the load manager 202 creates another session corresponding to an original session with an intended host. The load manager 202 may switch the service to at least one of (i) a unidirectional path or (ii) a bidirectional path based on a nature of service required and a level of congestion in a unidirectional downlink of the broadcast offload packet core (BO-PC) 208 and the cellular packet core 206. In some embodiments, a switching action at the converged UE 204 is done by a user or a client. In some embodiments, the switching action may be controlled by the load manager 202 through a channel embedded in a data path. In some embodiments, the converged UE 204 includes at least one of (i) a broadcast receiver or (ii) a satellite receiver to receive a unidirectional downlink signal. The converged UE 204 includes a generic cellular modem functionality.

Figure 3:
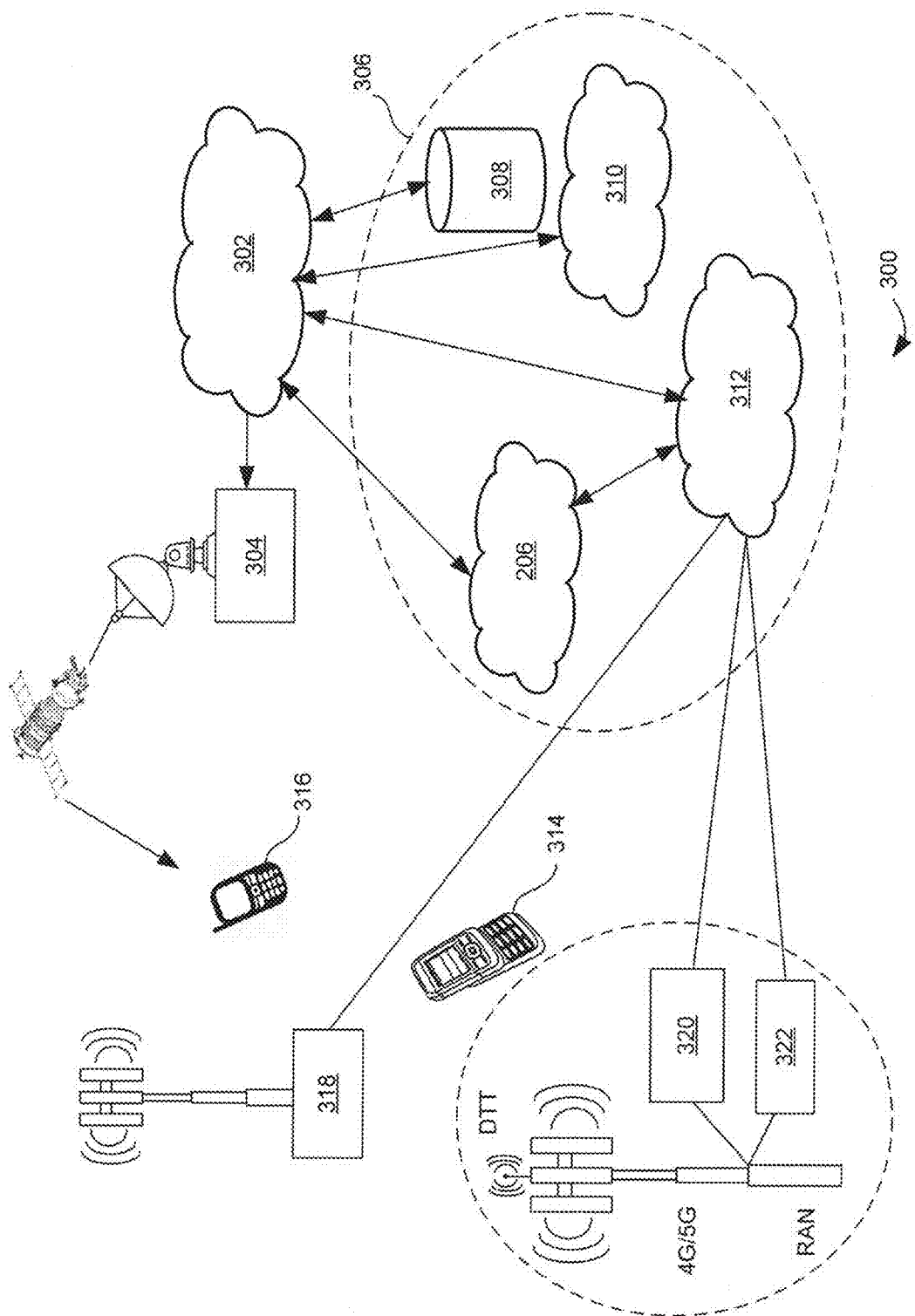
FIG. 3 is a block diagram that illustrates the converged core network according to some embodiments herein.

FIG. 3 is a block diagram 300 that illustrates a converged core network according to some embodiments herein. The converged core network includes a "Broadcast/Offload Packet Core (BO-PC) 302 and a cellular packet core 206. In some embodiments, the converged core network 300 includes a group of existing elements 306. The group of existing elements 306 includes a Content Delivery Network (CDN) 308, a World Wide Web 310, a legacy IP Backhaul network 312 and the cellular packet core 206. The converged core network 300 provides services to at least one of (i) a converged cellular DTT UE 314 or (ii) a converged cellular/satellite UE 316 using a satellite earth station 304, a cellular base station 318, a second cellular base station 320 and at least one Broadcast Radio Head (BRH) 322. In some embodiments, the legacy IP Backhaul network 312 is reused for connectivity to the at least one BRH 322. The BO-PC 302 serves UHF/VHF based "Digital Terrestrial Transmission (DTT)" and a Satellite based Unidirectional Downlink. The legacy IP backhaul network 312 may be used to deliver (i) offloaded traffic, (ii) broadcast and (iii) unicast to the at least one BRH 322 collocated with the second cellular base station 320 for the digital terrestrial transmission (DTT) based unidirectional downlink. In some embodiments, the legacy IP backhaul network 312 supports at least one of (i) cellular base stations, (ii) the at least one broadcast radio head (BRH) 322, and (iii) a satellite head-end. In some embodiments, a satellite link that acts as a backhaul link for the at least one Broadcast Radio Head (BRH) 322. In some embodiments, the satellite link forms the broadcast radio access network (RAN) for a terrestrial unidirectional downlink. In some embodiments, cellular connectivity may have low throughput if locations having poor backhaul. In some embodiments, a satellite downlink may be used to bypass the legacy IP backhaul network 312 and deliver a content, e.g. a rich video directly to the converged cellular/satellite UE 316 without any action initiated by a user. In some embodiments, this task is done by the BO-PC 302 itself. In some embodiments, any home network further distributes the content to personal devices. In some embodiments, the personal devices, without limitation, may be a mobile phone, a Personal Digital Assistant (PDA), a tablet, a desktop computer, or a laptop.

The cellular packet core 206 controls a cellular radio access network (RAN) for providing a bidirectional connectivity to a converged user equipment (UE) to transmit or receive data. The Broadcast offload packet core (BO-PC) 302 controls a broadcast radio access network (RAN). The broadcast radio access network (RAN) includes the at least one Broadcast Radio Head (BRH) 322 for providing a unidirectional downlink path to the converged user equipment (UE) to receive the selected data through the at least one Broadcast Radio Head (BRH) 322. The Broadcast Offload-Packet Core (BO-PC) 302 includes an analytics engine that is configured to gather traffic flow data from at least one of (i) the cellular packet core 206, or (ii) the converged user equipment (UE). In some embodiments, the Broadcast Offload Packet Core (BO-PC) (302) is a part of 2G, 3G, a Wi-Fi, 4G, and 5G networks.

The analytics engine performs traffic pattern analysis on the traffic flow data determines the traffic flow and determines the traffic flow that is suitable to be sent over the unidirectional downlink or the cellular network. In some embodiments, the analytics engine selects the contents and the streams to be sent via the unicast pipe for indoor users using a Supplementary Downlink (SDL) Channel as a part of the unidirectional downlink path.

Figure 4A:
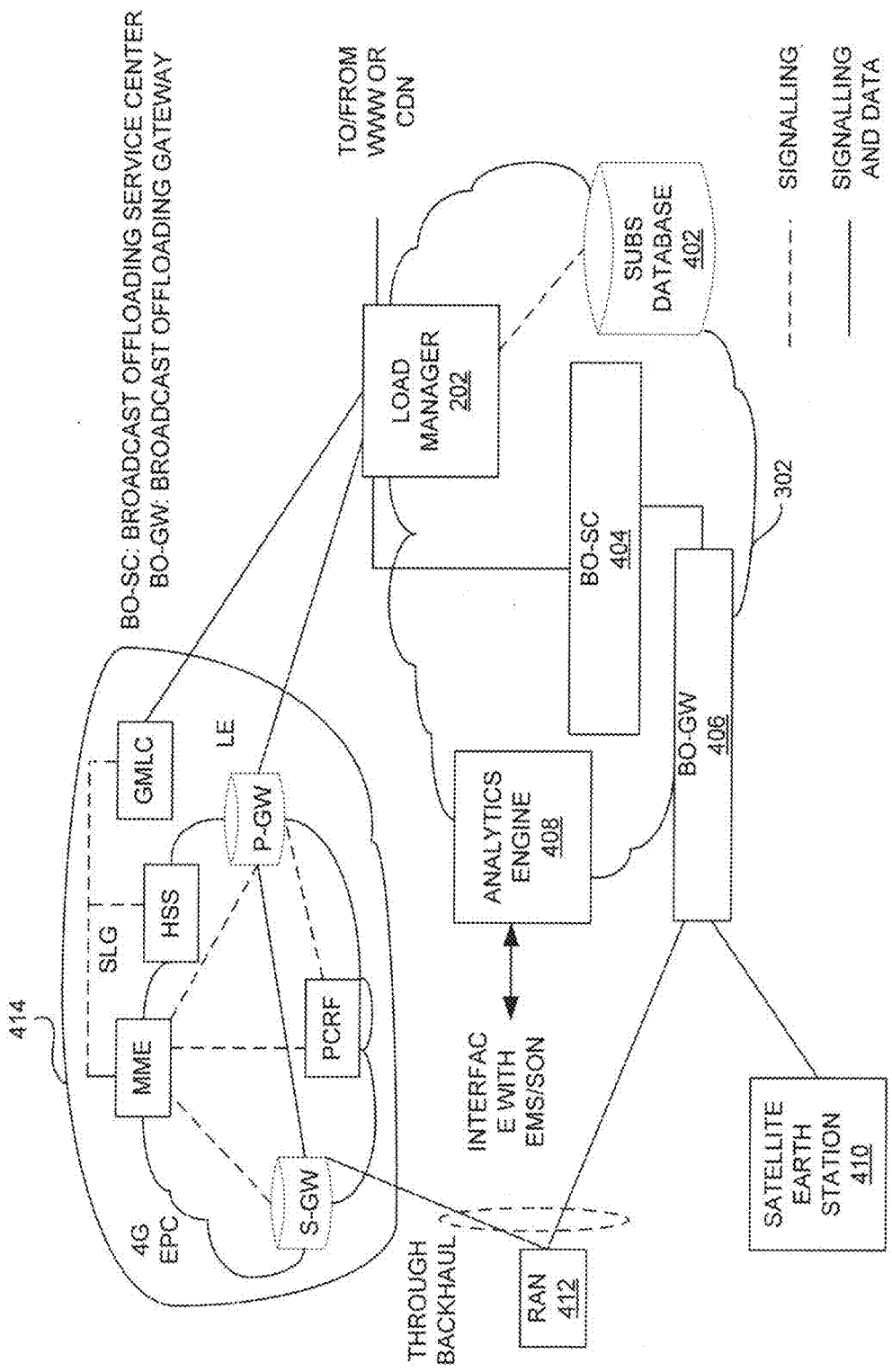
FIG. 4A is a block diagram that illustrates an interaction between various elements in a "Broadcast/Offload Packet Core (BO-PC)" and an existing cellular "Enhanced Packet Core (EPC) incorporated in 3GPP for a 4G network according to some embodiments herein.

FIG. 4A is a block diagram that illustrates an interaction between various elements in the Broadcast/Offload Packet Core (BO-PC) 302 and an existing cellular "Enhanced Packet Core (EPC) incorporated in 3GPP for a 4G network according to some embodiments herein. The load manager 202 placed between a "Packet Gateway (P-GW)" of a legacy EPC (in a 4G network) and an external world. The BO-PC 302 includes the load manager 202, a Subscriber (SUBS) database 402, a Broadcast/Offload Service Center (BO-SC) 404, a Broadcast/Offload Gateway (BO-GW) 406 and an analytics engine 408. In some embodiments, the 4G network may include control links with a legacy "Gateway Mobile Location Centre (GMLC)" and the analytics engine 408, which is a part of the BO-PC 302. The Broadcast Offload Packet Core (BO-PC) 302 interfaces with the Gateway Mobile Location Centre (GMLC) to obtain a location information of the converged UE 204 to provide a handoff mechanism when a unidirectional downlink is used for a unicast traffic.

The Subscriber (SUBS) database 402 includes a user information that is determined by a unique identity of the converged user equipment (UE) 204 to extract selected data from the traffic flow data between the cellular packet core 206 and the converged UE 204. The Broadcast Offload Service Center (BO-SC) 404 schedules the traffic flow to be transmitted over the unidirectional downlink for all BRH under the Broadcast Offload Service Center (BO-SC) 404 control. The Broadcast Offload Service Center (BO-SC) 404 also performs Robust Header Compression (RoHC), and a data encryption on a per stream basis of the selected data.

In some embodiments, the Broadcast Offload Gateway (BO-GW) 406 is configured to interface to the legacy IP Backhaul network 312 to connect all the Broadcast Radio Heads (BRHs) through a unicast link or multicast links. The Broadcast Offload Gateway (BO-GW) 406 tunnels header compressed IP packets over the legacy IP backhaul network 312 destined to a target Broadcast Radio Head (BRH). In some embodiments, the legacy IP Backhaul network 312 is configured from an Element Management System (EMS). In some embodiments, the BO-GW 406 operates on lower layers of an OSI protocol stack and sequences packets according to the transmit sequence, segregates the unicast and broadcast traffic and sends them to the legacy IP Backhaul network 312.

The analytics engine 408 is configured to gather traffic flow data from at least one of (i) the cellular packet core 206, or (ii) the converged user equipment (UE) 204. The converged user equipment (UE) 204 is an enhanced user equipment that is configured to receive contents from a cellular network and the contents from the unidirectional downlink path through the Broadcast Offload Packet Core (BO-PC) 302. In some embodiments, the analytics engine 408 gathers the traffic data in the cellular network through at least one of (i) an "Element Management System (EMS)" or (ii) a "Self-Optimizing Network (SON)" and that reported by the converged UE 204 and the load manager 202 that monitors each and every flow through it. In some embodiments, the analytics engine 408 includes a geographical database that includes latitude and longitude and various radio frequency (RF) parameters, e.g. estimated signal strengths, SINR, capacity utilization based on time of day etc. The various radio frequency RF parameters include reference signal levels, noise and interference levels, traffic patterns, which quantifies coverage and a quality of service of a given location. The geographical database along with a traffic pattern analysis on the traffic flow data determines the traffic flow that is suitable to be sent over the unidirectional downlink. In some embodiments, the analytics engine 408 includes a radio environment database. The radio environment database includes a data on a geographical location, latitude, longitude, and various radio frequency RF parameters. In some embodiments, the various radio frequency RF parameters include reference signal levels, noise and interference levels, traffic patterns, which quantifies coverage and a quality of service at given locations.

The at least one Broadcast Radio Head (BRH) 322 is configured to transmit the selected data from the broadcast radio access network (RAN) to the converged user equipment (UE) 204. In some embodiments, the at least one Broadcast Radio Head (BRH) 322 dynamically switches from a single frequency network (SFN) to a multiple frequency network (MFN) or from the multiple frequency network (MFN) to the single frequency network (SFN). In some embodiments, the dynamic switching is based on a demographic distribution. In some embodiments, the at least one Broadcast Radio Head (BRH) 322 in a first region is configured to operate in a Single Frequency Network (SFN) or Multi Frequency Network (MFN) mode and the at least one Broadcast Radio Head (BRH) 322 in a second region is configured to concurrently operate in a unicast mode, based on a decision determined by the load manager 202 and the analytics Engine 408.

The load manager 202 is configured to monitor a nature of service required by the converged user equipment (UE) 204. In some embodiments, the load manager 202 controls the traffic flow through at least one of the (i) the cellular network or (ii) the unidirectional downlink path based on a data analysis carried out by the analytics engine 408. The analytics engine 408 analyzes a set of metrics gathered from at least one of (i) the cellular packet core 206 and (ii) the cellular radio access network (RAN) 412. In some embodiments, the set of metrics includes (i) the traffic flow data, (ii) the level of congestion in the cellular packet core 206 and the cellular radio access network (RAN) 412, (iii) throughput of the cellular connectivity, (iv) packet jitter, (v) channel occupancy in the unidirectional downlink, and (vi) pre-decided policy metrics. In some embodiments, the packet jitter measurement inside the load manager 202 may provide insights into network congestion. In some embodiments, the level of congestion is estimated from sizes of transmit buffer queues in a cellular base station obtained from at least one of (i) the Element Management System (EMS) that controls and monitors the cellular base stations or (ii) indirectly inferred from the converged UE 204 by measuring an elapsed time between a first scheduling request and an actual data transfer. In some embodiments, the converged UE 204 is capable of estimating a traffic intensity at a geographical region by performing measurements of the elapsed time between the first scheduling request and the actual data transfer in a cellular modem. In some embodiments, the load manager 202 generates a "table of contents" for broadcast streams and is made available to the converged UE 204. If the converged UE 204 identifies a desired content in the "table of contents", the converged UE 204 starts consuming the desired content and notify the consumed content to the load manager 202 over the Cellular Uplink. In some embodiments, the analytics engine 408 and a Content Distribution Network (CDN) are made aware of consumption and add information of the consumed content to a database.

In some embodiments, the load manager 202 may interface to a broadcast receiver that receives at least one of (i) a terrestrial TV signal or (ii) a Satellite TV signal and converts the terrestrial TV signal or the satellite TV signal to IP Packets. The IP Packets are delivered using the unidirectional downlink network to any converged user equipment such as the examples of the converged Cellular/DTT UE 314 or the converged Cellular/Satellite UE 316. Hence in a generic sense the CDN services (shown in FIG. 3) are considered to include TV CDN Service which is optimized and built for real time live TV delivery to the load manager 202.

The load manager 202 switches services required by the converged UE 204 from the cellular packet core 206 to the broadcast offload packet core 302 or from the broadcast offload packet core 302 to the cellular packet core 206 based on an input provided by the analytics engine 408.

The load manager 202 decides whether to switch the transmission of the selected data from at least one of (i) a downlink traffic of the cellular packet core 206 to a unidirectional downlink of the Broadcast Offload Packet Core (BO-PC) 302 or (ii) the unidirectional downlink of the Broadcast Offload Packet Core (BO-PC) 302 to the downlink traffic of the cellular packet core 206 based on an analysis result suggested by the analytics engine 408. In some embodiments, the analytics engine 408 selects contents and streams to be sent via the unidirectional downlink as a unicast or multicast or broadcast mode of delivery.

Figure 4B:
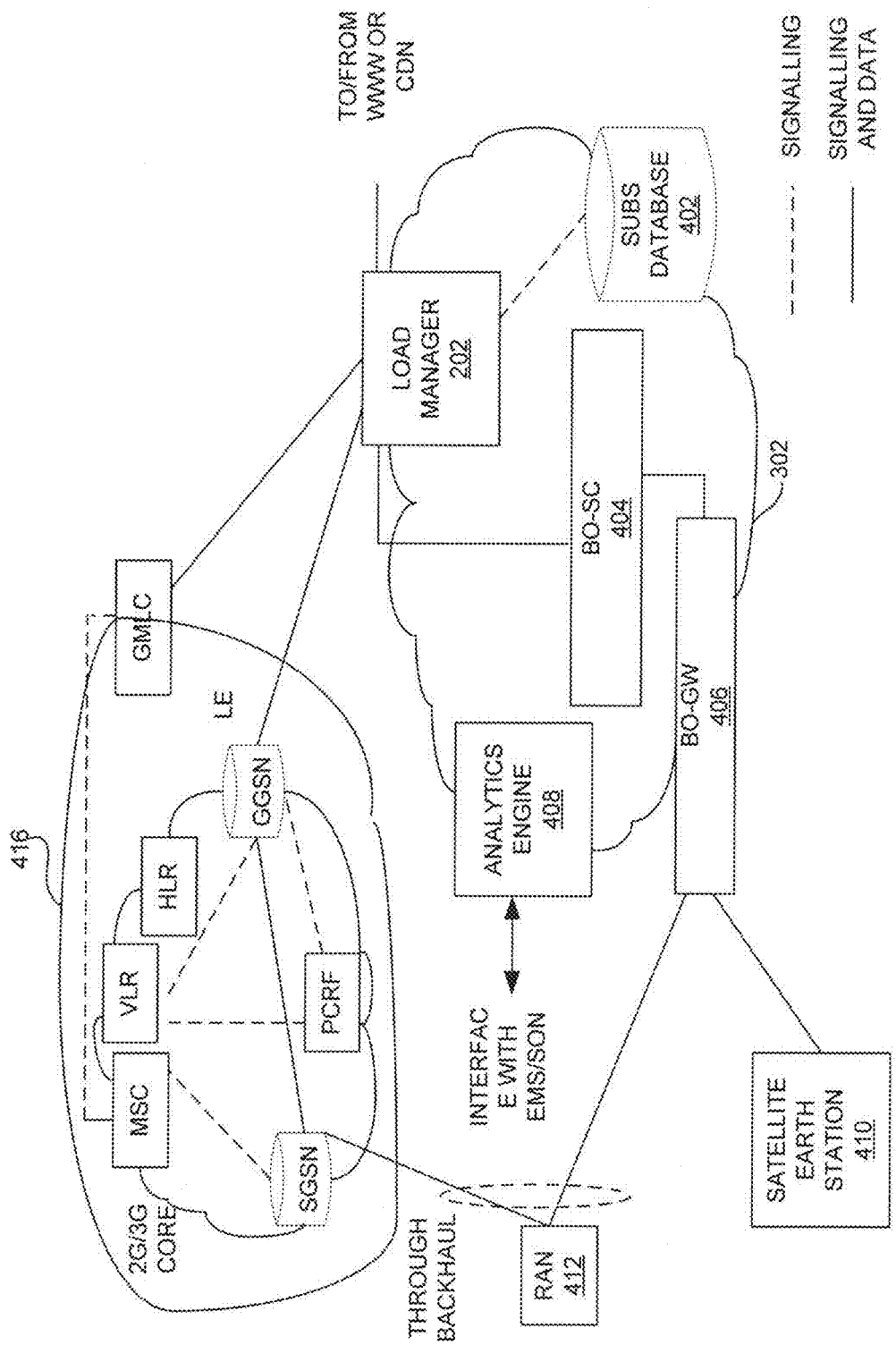
FIG. 4B is a block diagram that illustrates interaction between various elements in the BO-PC and a 2G/3G core network according to some embodiments herein.

FIG. 4B is a block diagram that illustrates interaction between various elements in the BO-PC 302 and a 2G/3G core network according to some embodiments herein. The BO-PC 302 includes the load manager 202, the Subscriber (SUBS) database 402, the Broadcast/Offload Service Center (BO-SC) 404, the Broadcast/Offload Gateway (BO-GW) 406 and the analytics engine 408. The RAN 412 for the 2G core network may include a Base station Controller (BSC) and a number of Base stations (BTS). The RAN 412 for the 3G core network may include a Radio Network Controller (RNC) and one or more NodeBs. In some embodiments, the at least one Broadcast Radio Head (BRH) 322 is still the part of the RAN 412 for a 4G core network. The functions of these components have been explained above.

Figure 4C:
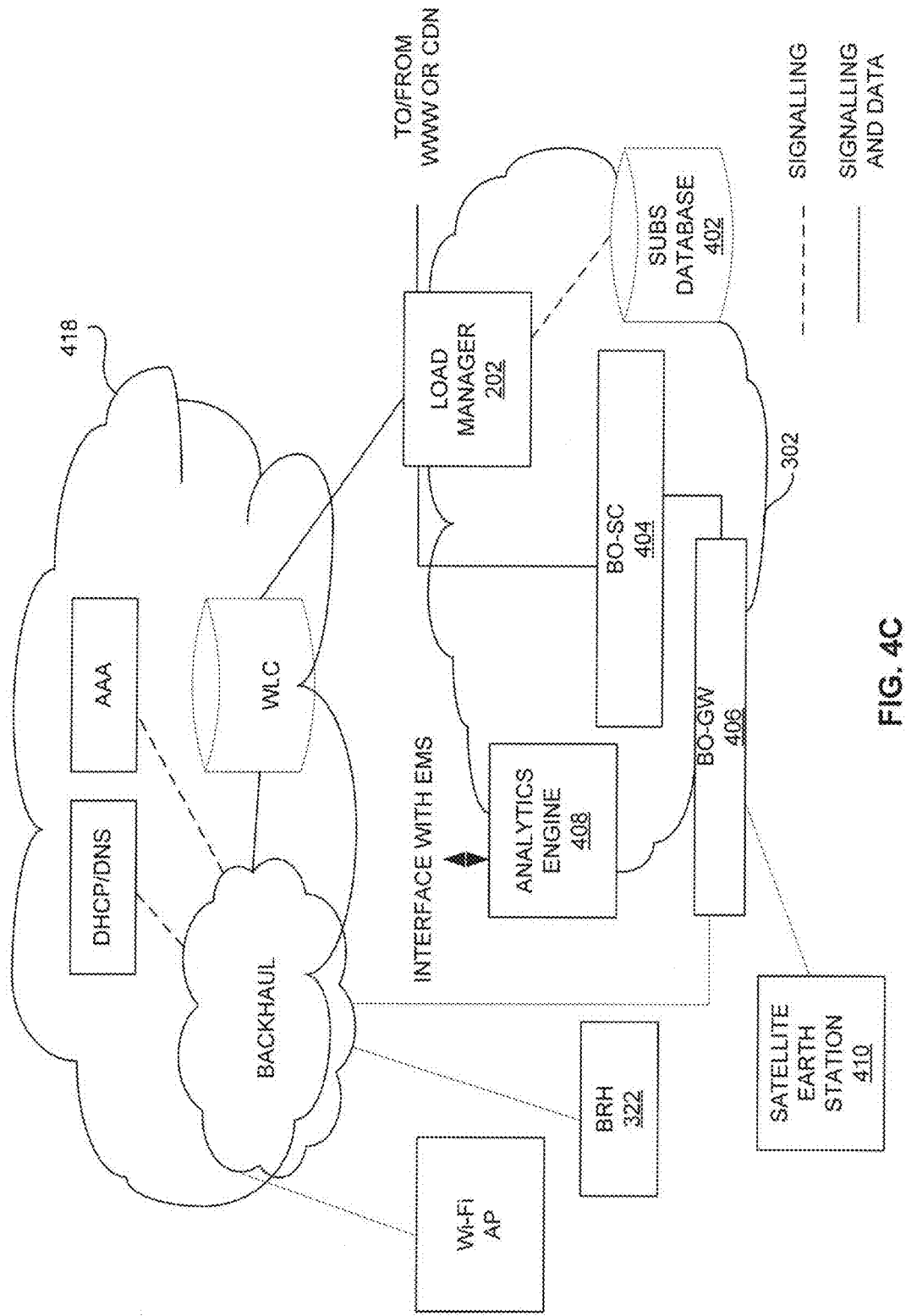
FIG. 4C is a block diagram that illustrates interaction between various elements in the BO-PC and a public Wi-Fi network according to some embodiments herein.

FIG. 4C is a block diagram that illustrates interaction between various elements in the "BO-PC 302 and a public Wi-Fi network according to some embodiments herein. The BO-PC 302 includes the load manager 202, the Subscriber (SUBS) database 402, the Broadcast/Offload Service Center (BO-SC) 404, the Broadcast/Offload Gateway (BO-GW) 406, the analytics engine 408. In some embodiments, if coverage of a Wi-Fi access point is small, a serving access point identifier that provides a location of the converged UE 204 to enable a selection of a best suited Broadcast Radio Heads (BRHs) to serve it. In some embodiments, a Wireless LAN controller (WLC) that serves as a cluster of Wi-Fi access points, connected over the legacy IP Backhaul network 312. In some embodiments, Wi-Fi users are authenticated using an Authorization Authentication and Accounting (AAA) server. In some embodiments, a Dynamic Host Configuration Protocol (DHCP) and a Domain Name System (DNS) are standard components for IP access for (i) allocating of IP address to the converged UE 204 and (ii) querying the IP address of a website. The functions of these components have been explained above.

Figure 4D:
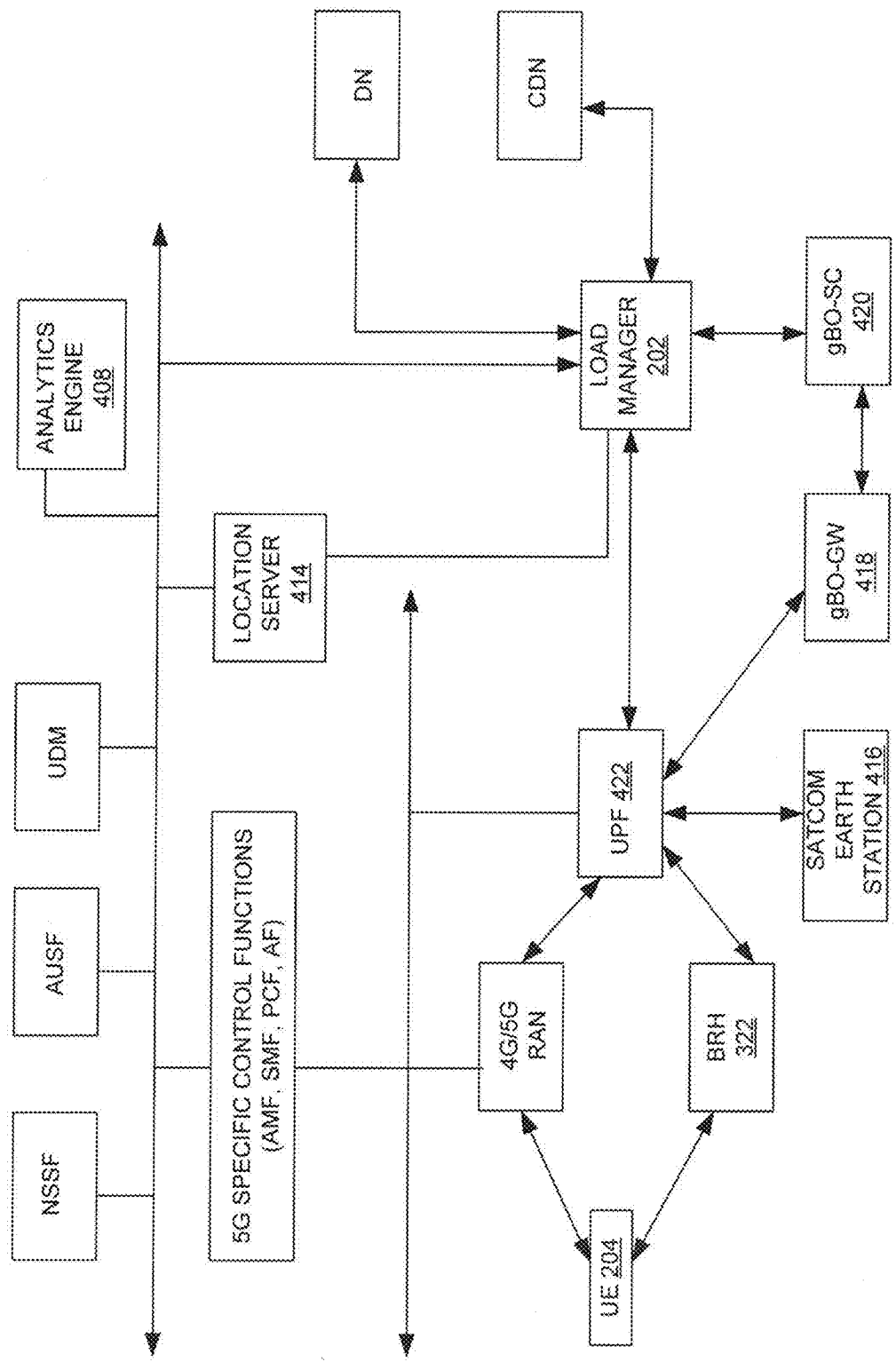
FIG. 4D is a block diagram that illustrates a core network implementation for a future 5G network that combines the elements of both the EPC (as shown in FIG. 4A) and the BO-PC according to some embodiments herein.

FIG. 4D is a block diagram that illustrates a core network implementation for a future 5G network that combines the elements of both the EPC (as shown in FIG. 4A) and the BO-PC 302 according to some embodiments herein. The BO-PC 302 includes a direct interaction with 3GPP defined elements, e.g. NSSF, AUSF, Unified Data Management (UDM), Access and Mobility Management Function (AMF), Session Management Function (SMF) PCF, AF and User Plane Function (UPF) 422 as defined in 3GPP TS 23.501. In some embodiments, all these elements include exposed APIs that allow them to expose network related information in the 5G core network. The Subscriber (SUBS) Database 402 function shown in FIG. 4A is merged with a generic "(UDM)". The Subscriber (SUBS) database 402 includes a user information that is determined by a unique identity of the converged user equipment (UE) 204 to extract selected data from traffic flow data between the cellular packet core 206 and the converged user equipment (UE) 204. In some embodiments, 5G standard involves a pre-shared symmetric key between the converged UE 204 and the UDM. It is proposed that an additional set of asymmetric keys are shared between them, with the private key being in the converged UE 204 and the public key in the UDM. The UPF 422 provides a unified interface and a generalized control mechanism to interact with the legacy IP backhaul network 312, which is further customized using a concept of network slicing. The BO-SC 404 and the BO-GW 406 shown in FIG. 4A are now more generalized to gBO-SC 420 and gBO-GW 418 as they may include a capability of adding unidirectional access in a Cellular frequency bands itself as in a "Further evolved Mobile Broadcast Multicast Service (FeMBMS)". In this regard, it may be thought of as a further generalization of the 3GPP elements required for eMBMS services, which include BM-SC and BM-GW. In some embodiments, a location of the converged UE 204 is obtained from the AMF through a location server 414 which may be used for the handoff mechanism for the unidirectional downlink. In some embodiments, IP address of the converged UE 204 is obtained from the "SMF. The proposed mechanisms are key enablers for 5G technologies that address "broadcast offload" and "ubiquitous coverage" including use of a satellite downlink from a SATCOM earth station 416.

Figure 5A:
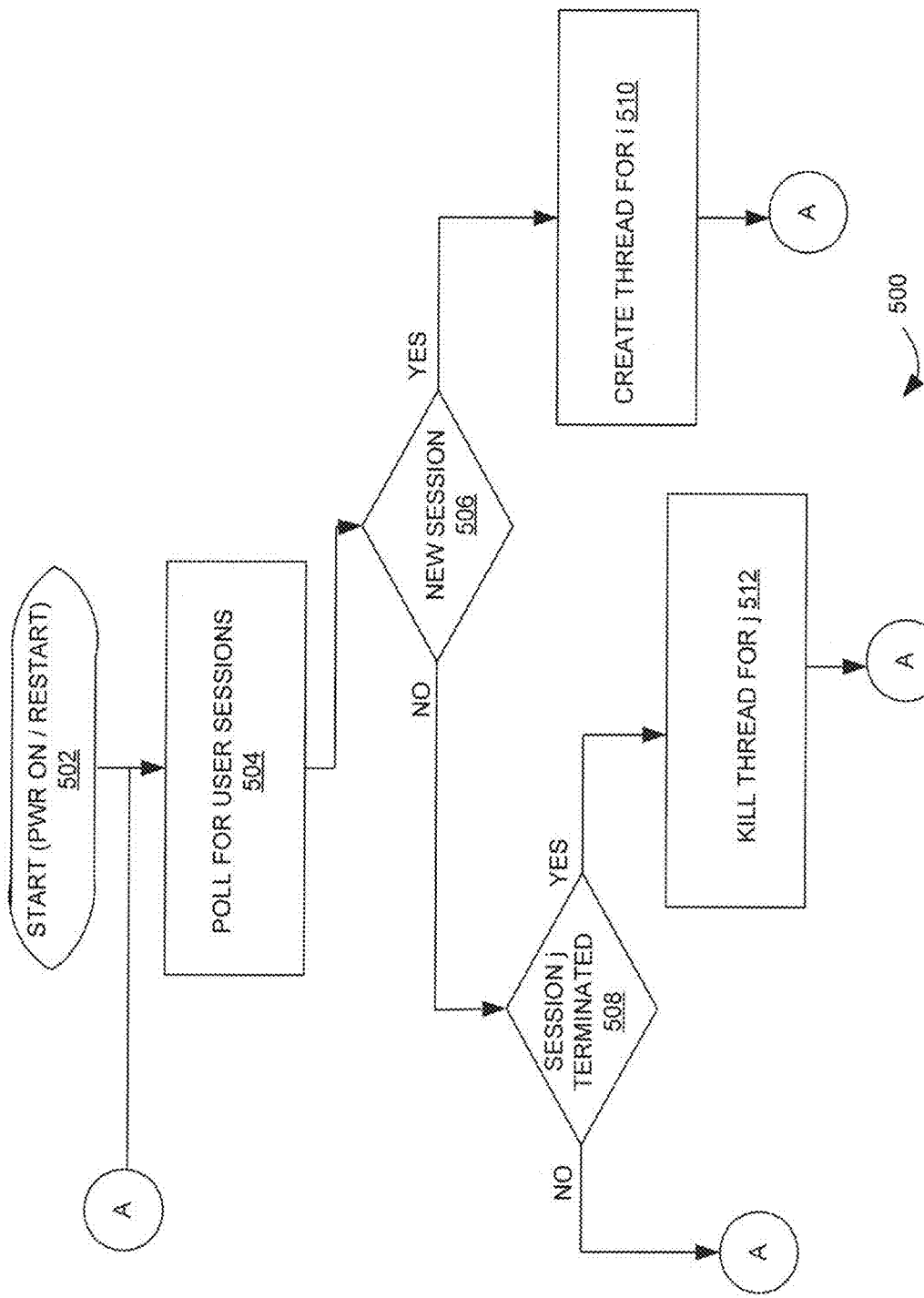
FIGS. 5A and 5B are flowcharts that illustrate an operation of a load manager according to some embodiments herein.

FIG. 5A illustrates a flowchart of an operation 500 of the load manager 202 according to some embodiments herein. In some embodiments, the load manager 202 includes a number of dynamic threads. At step 502, the operation 500 starts creating each thread on addition of a new session from any of the converged user equipment (UE). At step 504, the operation 500 initializes the load manager 202 to poll for user sessions and monitor existing user sessions. At step 506, the operation 500 checks each user session to determine whether a user session is a new user session (i) or an existing user session (j), if Yes goes to step 510 else goes to step 508. At 510, the operation 500 generates a thread on addition of the new user session (i) originating from at least one converged user equipment (UE). At 508, the operation 500 determines whether the existing user session (j) is terminated. In some embodiments, if the existing user session (i) is terminated then kill threads corresponding to terminated user sessions to free up computational and storage resources at step 512.

Figure 5B:
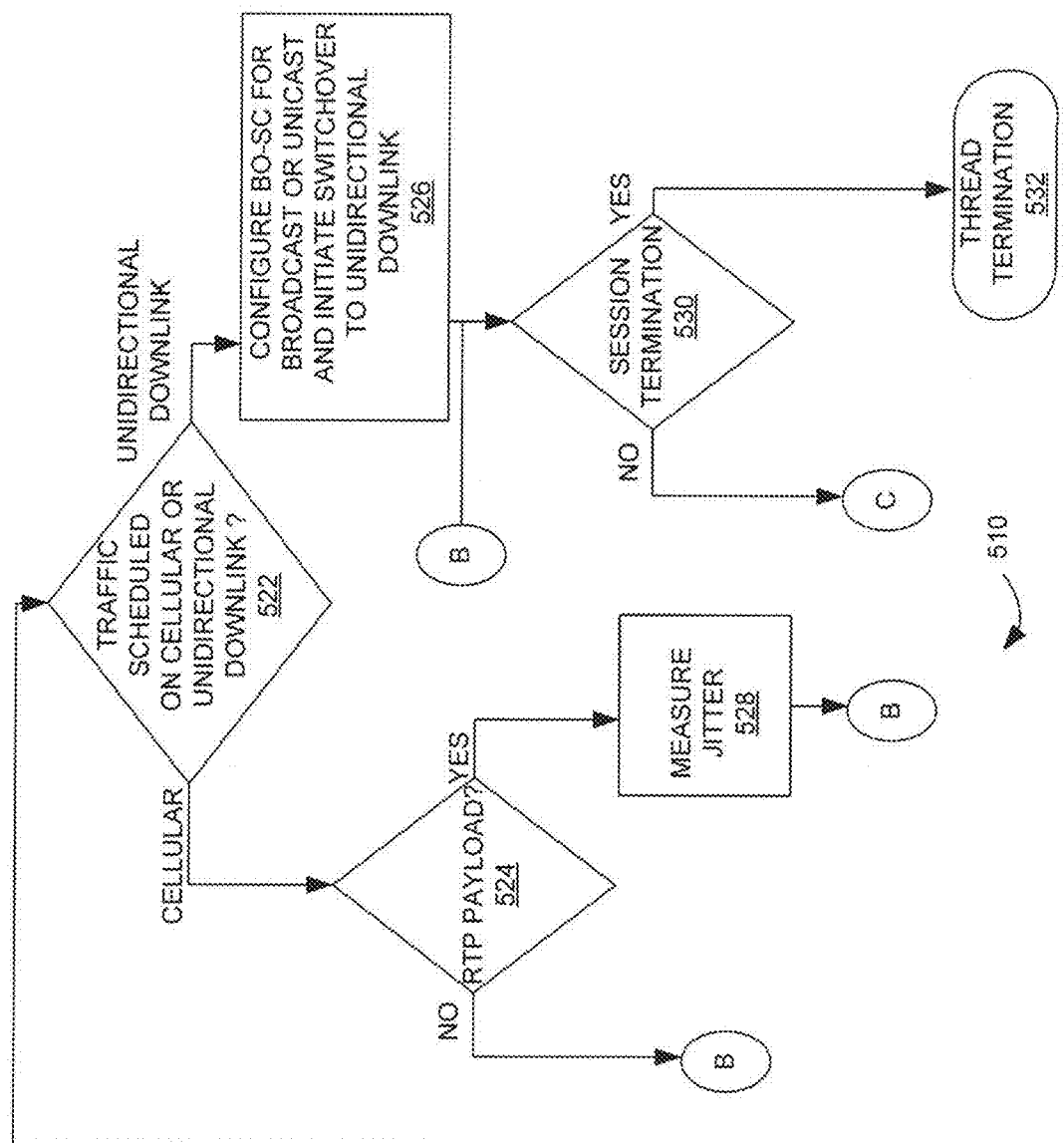
Figure 5B:
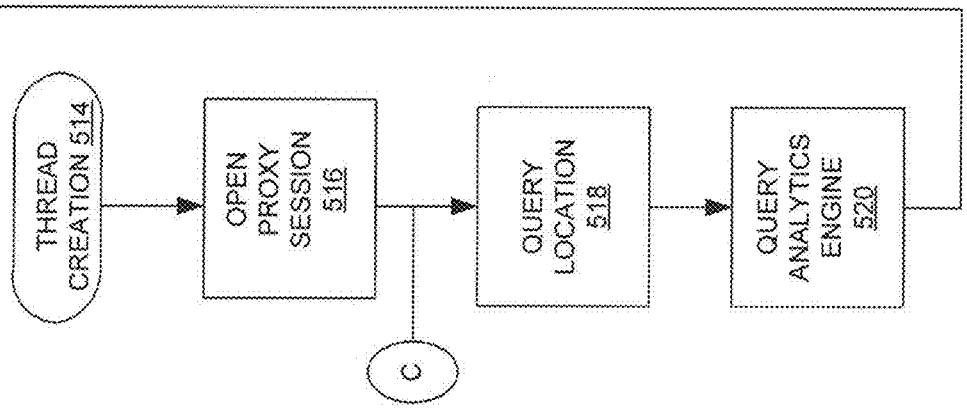

FIG. 5B illustrates a flowchart of an operation 510 of the load manager 202 according to some embodiments herein. At step 514, the operation 500 includes generates a thread for a session. In some embodiments, the session creates a client to host to which an original session at the converged UE 204 intended to connect by opening a proxy session at step 516, on behalf of the converged UE 204. At step 518, the operation 500 queries a location of the converged UE 204 for a session specific thread by the load manager 202. At step 520, the operation 500 queries the analytics engine 408 to determine best means to connect it in the downlink. At step 522, the operation 500 checks if traffic scheduled on cellular or unidirectional downlink if cellular goes to step 524 else goes to step 526. For certain duplex flows like voice and video calls, only the cellular network may be used. At step 524, the operation 500 includes the load manager 202 performs a deep inspection of RTP timestamps to measure latency and jitter in the cellular network, which provide a measure of congestion at step 528. At step 526, the operation 500 configures the BO-SC for the broadcast or the unicast and initiates switch over to the unidirectional downlink. At step 530, the operation 500 check if the session is terminated if yes goes to step 532 else goes to the step 518. At step 532, the operation 500 includes terminates all the threads created corresponding to a particular session.

In some embodiments, the load manager 202 interacts with a Content Distribution Network or a Content Delivery Network (CDN) to pull or push a content. "Application Programming Interfaces (APIs)" for the same is exposed to selected content providers like Google®, YouTube®, or Netflix®, to exploit the unidirectional downlink network for better QoS. The trigger for broadcast or unicast is signaled by the client residing on the converged user equipment (UE) 204.

Figure 6:
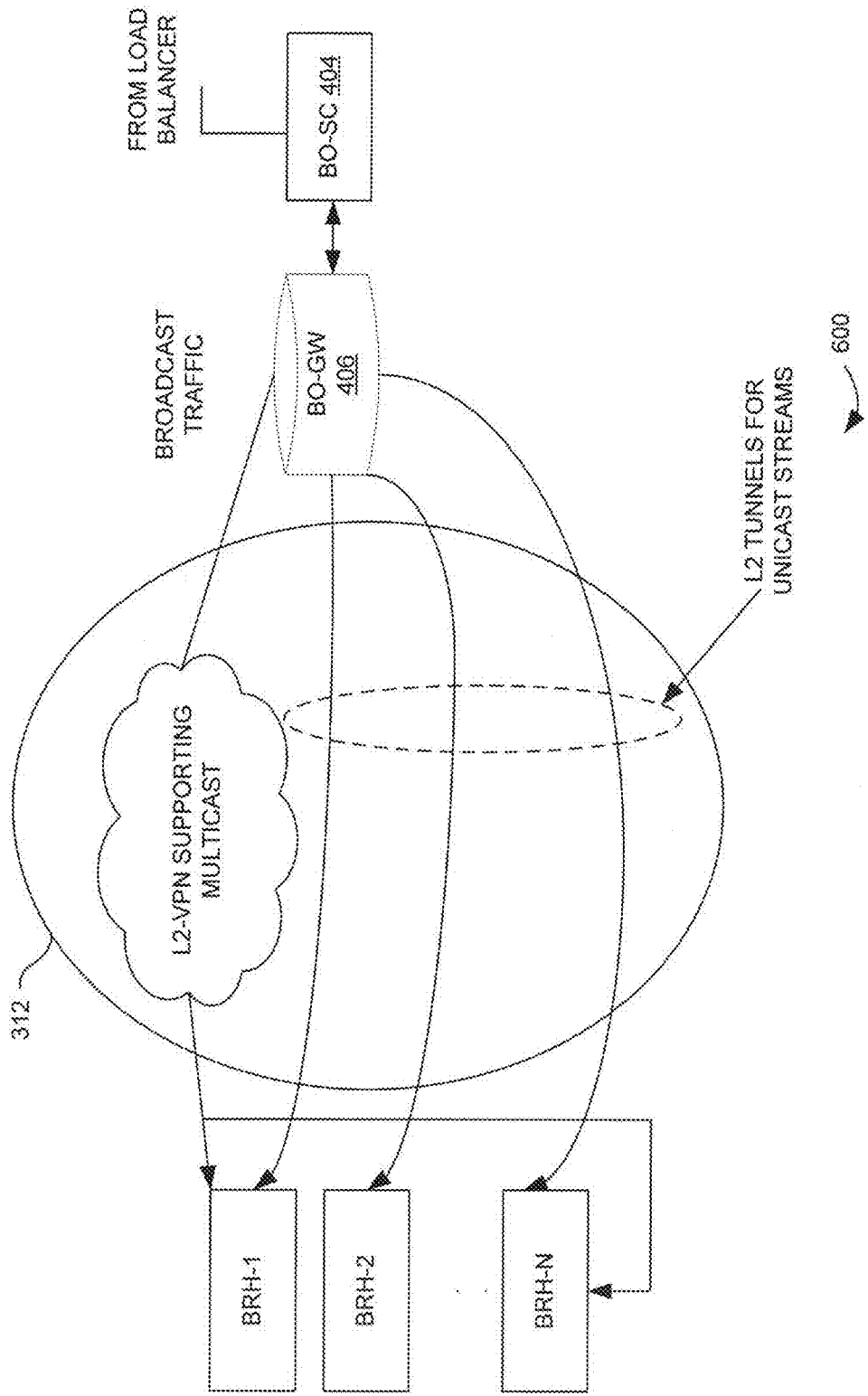
FIG. 6 illustrates an interaction between a "Broadcast/Offload Service Center (BO-SC)", a "Broadcast/Offload Gateway (BO-GW)", a Backhaul Network and at least one "Broadcast Radio Head (BRH)" according to some embodiments herein.

FIG. 6 illustrates an interaction 600 between the "BO-SC 404, the BO-GW 406, the legacy IP Backhaul network 312 and the at least one BRH 322 according to some embodiments herein. In some embodiments, the at least one BRH 322 or a plurality of Broadcast Radio Heads (BRHs) caters to a broadcast traffic by operating as a single frequency network (SFN) or a multi frequency network (MFN) and caters to unicast traffic by operating as a supplementary downlink (SDL). In some embodiments, a network architecture that changes from the single frequency network (SFN) or the multifrequency network (MFN) or the supplementary downlink is based on a set of conditions that is decided by the analytics engine 408. The IP Backhaul network 312 provides a "Layer 2 Virtual Private Network (L2-VPN)" service to broadcast traffic and a L2 Tunnel service for a unicast traffic. In some embodiments, the L2 tunnels are semi-permanent point-to-point paths that are created between the BO-GW 406 and individual Broadcast Radio Heads (BRHs). In some embodiments, the legacy IP Backhaul network 312 is configured from an Element Management System (EMS). If a new IP stream is added to the broadcast network, the at least one BRH 322 initiates an "Internet Group Management Protocol (IGMP)" request. The legacy IP Backhaul network 312 adds the new IP stream to multicast within the L2-VPN. The BO-GW 406 looks-up for the L2 address and VLAN tag (based on whether it unicast or broadcast) and forwards a frame to the corresponding L2 tunnel or L2 VPN based on a destination IP address of the at least one BRH 322.

Figure 7:
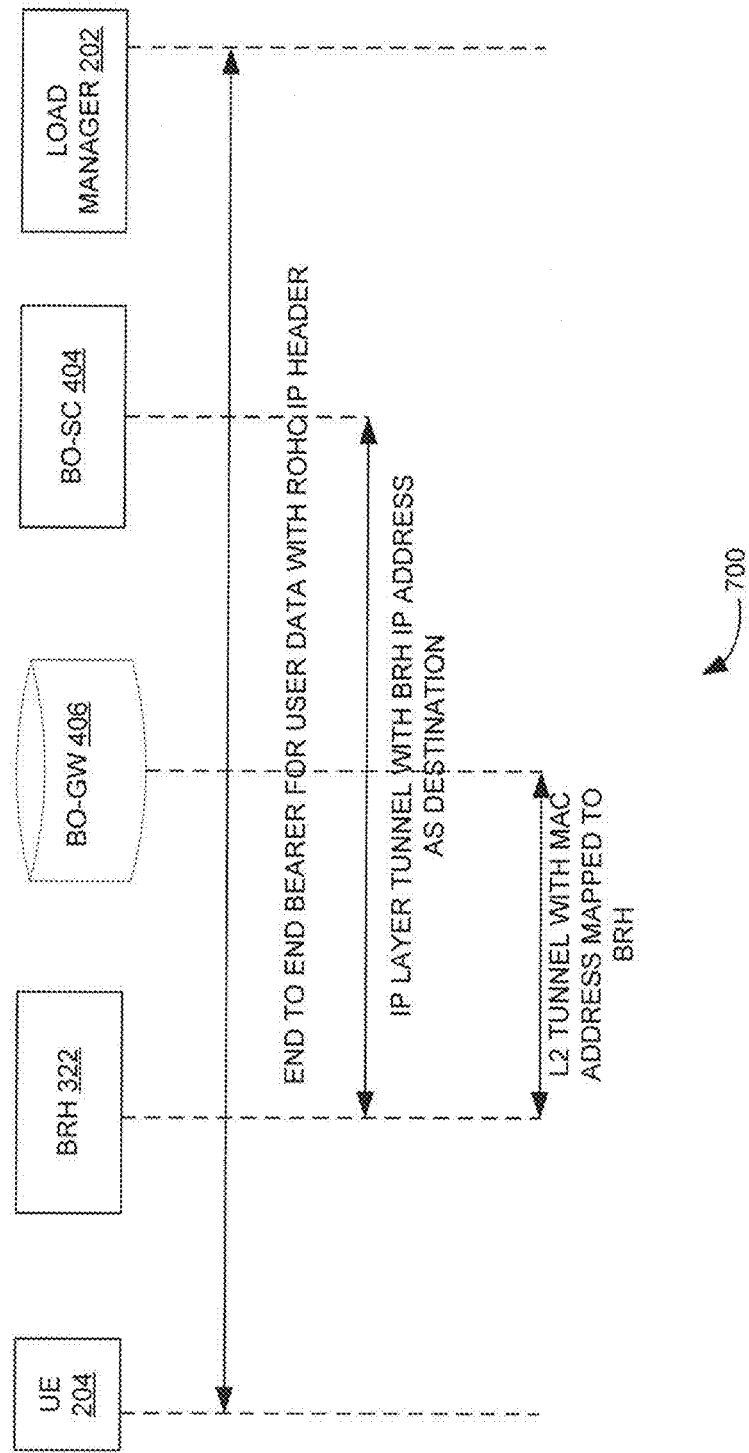
FIG. 7 is an interaction diagram that illustrates data traffic between a converged Use Equipment (UE), a load manager, the BO-SC, the BO-GW and the at least one BRH according to some embodiments herein.

FIG. 7 is an interaction diagram 700 that illustrates data traffic between the converged UE 204, the load manager 202, the BO-SC 404, the BO-GW 406 and the at least one BRH 322 according to some embodiments herein. In some embodiments, bearers are involved in carrying a user packet from the load manager 202 to the converged UE 204. In some embodiments, an IP address of the converged UE 204 is allocated by a P-GW of an EPC. In some embodiments, the IP address is reported by the converged UE 204 to the load manager 202. The IP address is used to access the converged UE 204 over aa unidirectional downlink by tunneling over another set of bearers. The BO-SC 404 compresses a header and tunnels the packet over another IP packet whose destination address is a selected BRH. If the converged UE 204 moves, the load manager 202 comes to know about a location of the converged UE 204 by constantly polling a GMLC (FIG. 4A) through a Le interface that provides the latitude, longitude, time stamp and an estimated error in its position and doing a geographical search on the at least one BRH 322 deployment database. The BO-GW 406 may add a L2 header, which may be tunneled through the legacy IP Backhaul network 312 to a desired BRH. The at least one BRH 322 may remove the L2 header and the IP tunnel header and map an original packet with a compressed header to a link layer and a physical layer of a broadcast standard and send to the converged UE 204 for demodulation. The converged UE 204 may decompress the compressed header to terminate the IP packet.

Figure 8:
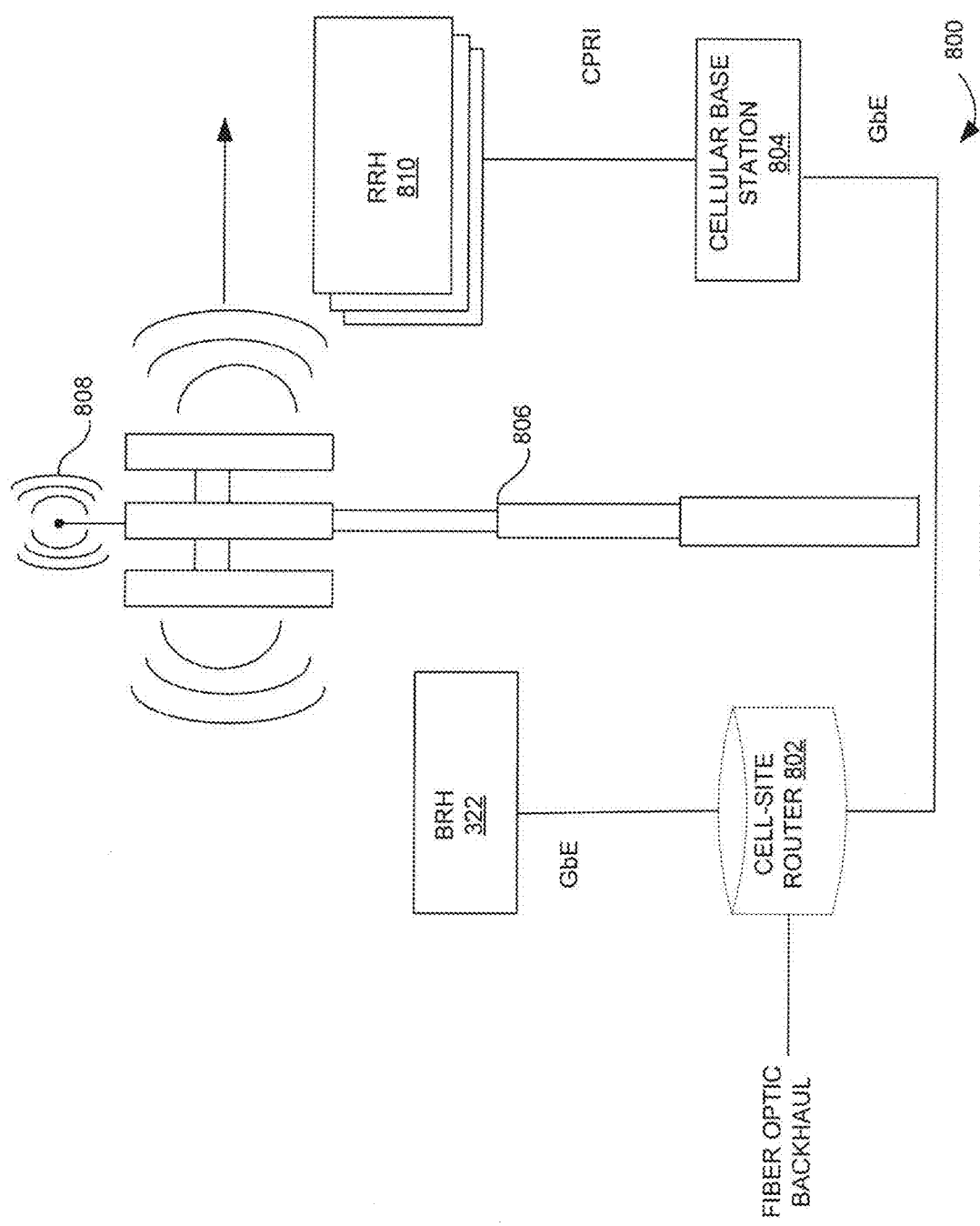
FIG. 8 is a block diagram that illustrates a tower site incorporating a cell site router, a cellular base station and the at least one BRH, along with an associated antenna according to some embodiments herein.

FIG. 8 is a block diagram 800 that illustrates a tower site incorporating a cell site router 802, a cellular base station 804 and the at least one BRH 322 along with an associated antenna 806 according to some embodiments herein. In some embodiments, modifications in a cell site for incorporating a Unidirectional link for a Digital Terrestrial Transmission (DTT) offload includes: a new network element named Broadcast Radio Head (BRH), an additional Gigabit Ethernet link between the cell site router 802 and the at least one BRH 322 and an additional DTT antenna 808. In some embodiments, an additional power is required based on a radiated power of the at least one BRH 322 that is decided by network planning. In some embodiments, the cell site may or may not need to be equipped with the at least one BRH 322 based on the network planning.

Figure 9:
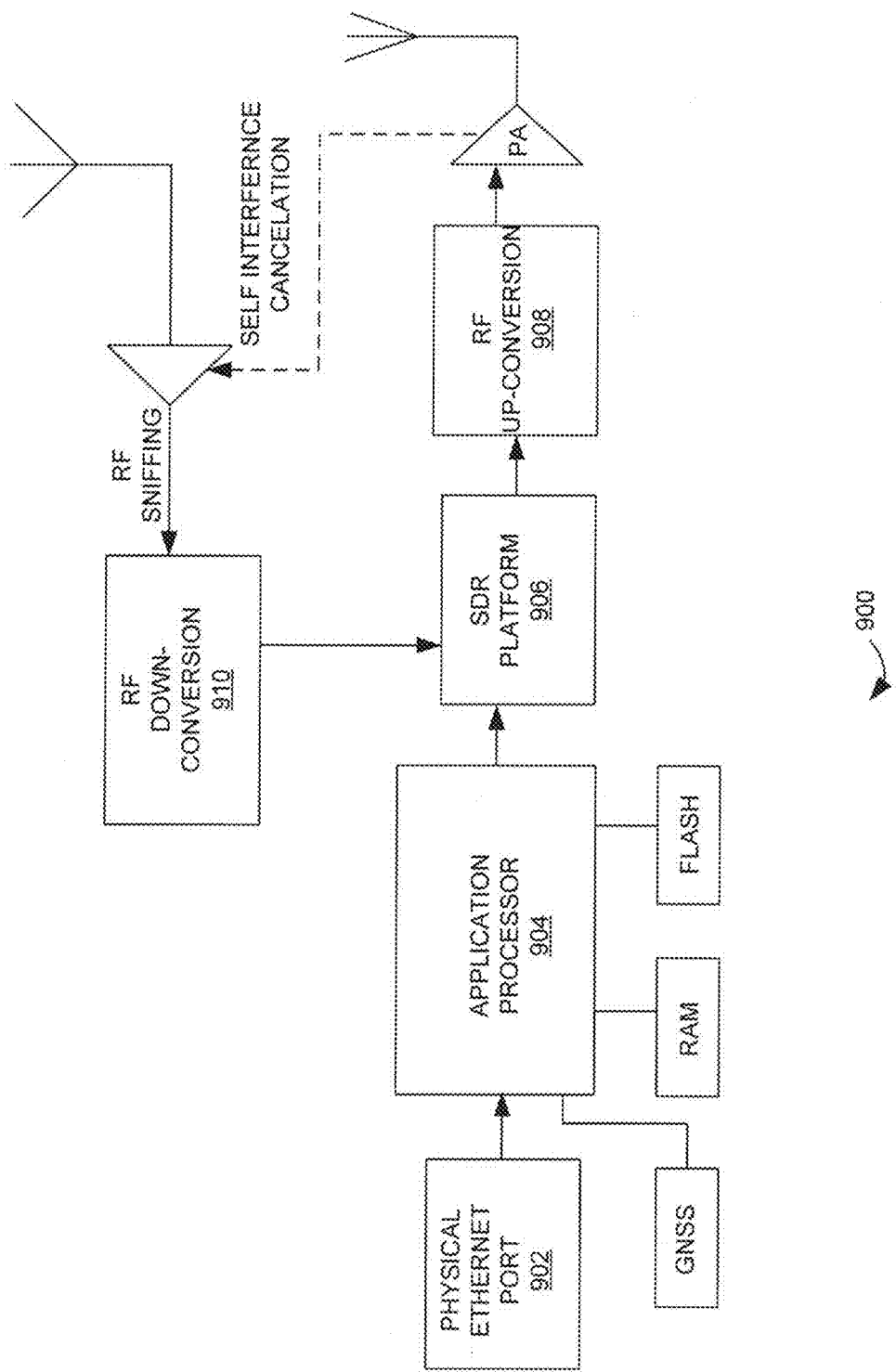
FIG. 9 is a block diagram of the at least one BRH according to some embodiments herein.

FIG. 9 is a block diagram 900 of the at least one BRH 322 according to some embodiments herein. In some embodiments, the block diagram 900 includes an ethernet physical PHY 902, an application processor 904, a software defined radio (SDR) platform 906, a radio frequency (RF) UP-conversion 908, and a radio frequency (RF) down-conversion 910. The ethernet physical PHY 902 is logically partitioned into two different networks (based on different VLAN Tags), that are (i) a broadcast UN network if a second network is corresponding to a unicast L2-tunnel. In some embodiments, on the radio interface, both streams may time share a same carrier or allocate different carriers for simplicity of network operations, but at a higher cost. In some embodiments, packets are received in an order in which they need to be transmitted that is as ensured by the BO-GW 406 and maintained by the legacy IP Backhaul network 312. In some embodiments, an IP tunnel that is created at the BO-SC 404 is terminated by the application processor 904. The application processor 904 maps user IP packets with a compressed header to broadcast specific data link layer functions and then sends to the SDR platform 906. The SDR platform 906 performs a forward error correction coding of data, modulation and wave shaping, before up converting to the RF frequency and radiating. In some embodiments, time alignment of a transmit function, as scheduled in the BO-SC 404 is done in the application processor 904.

Figure 10:
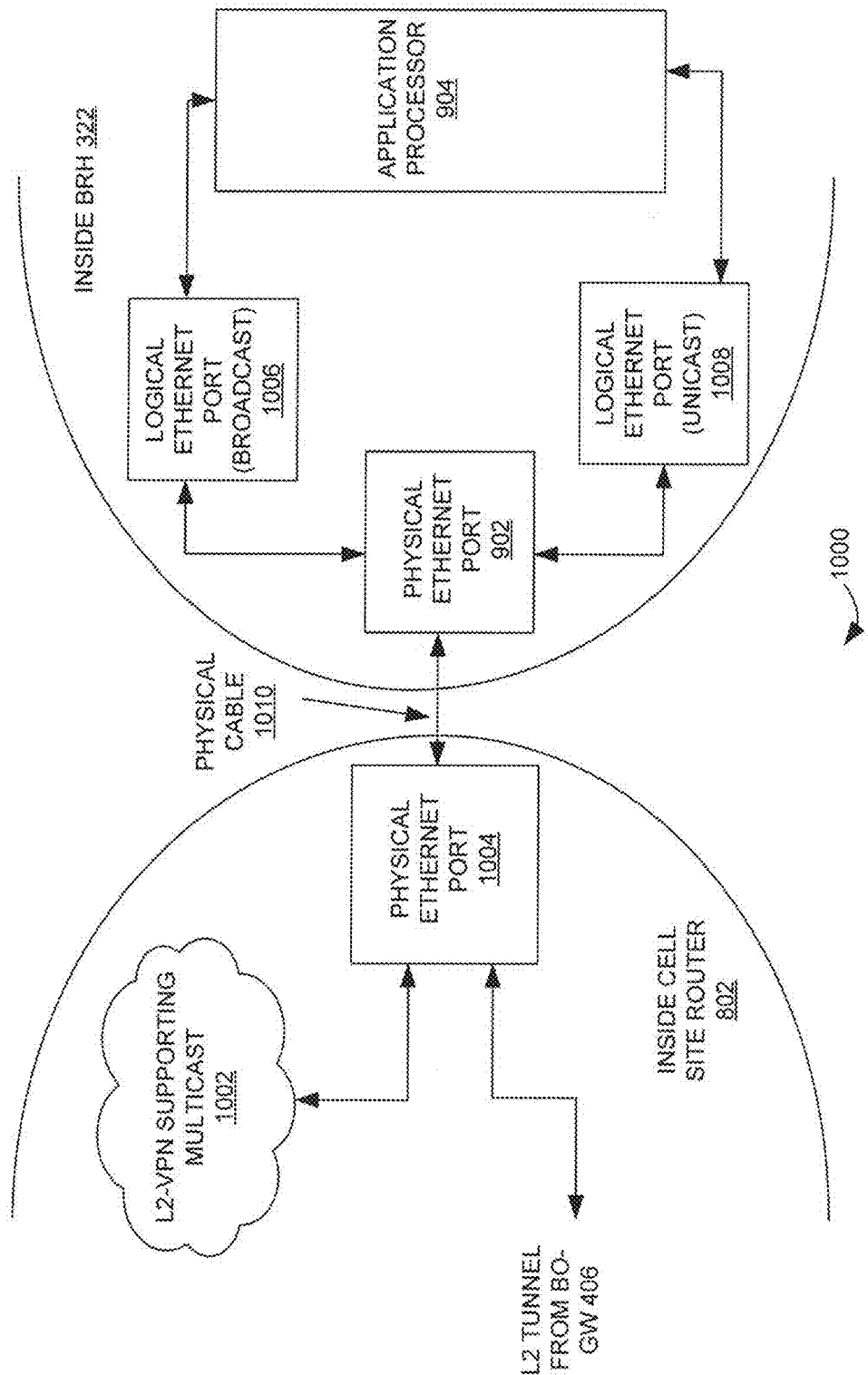
FIG. 10 illustrates a logical "layer 2 (L2)" switch distributed between the BO-GW, the backhaul network and the at least one BRH according to some embodiments herein.

FIG. 10 illustrates a logical "layer 2 (L2)" switch distributed 1000 between the BO-GW 406, the legacy IP backhaul network 312 and the at least one BRH 322 according to some embodiments herein. The logical "layer 2 (L2)" switch distributed 1000 includes two logical ports corresponding to a L2-VPN supporting multicast 1002 and L2-tunnel from BO-GW 406 and that of the at least one BRH 322 forms a virtual four port Ethernet switch supporting the two virtual LANs. The Application processor 904 removes all L2 headers of the two virtual LANs. The Application processor 904 terminates all in-band signaling related information required by a broadcasting standard and Operation and Maintenance (OAM) messages. The Application processor 904 pushes a bearer to the Software Defined Radio (SDR) platform 906. The SDR platform 906 may ensure that a same hardware may cater to any broadcast standards, e.g. ATSC 3.0, ATSC 1.0, DVB-T2, DVB-T, DVB-T2 Lite, FeMBMS, ISDB-T, DTMB etc., so that the legacy IP Backhaul network 312 deployments may still be supported. In some embodiments, the logical "layer 2 (L2)" switch distributed 1000 may allow different variants of a same standard to be configured on-the-fly to take care of terrain, velocity of the converged UE 204 etc. which includes modification of FFT sizes, Guard Intervals, modulation types and code rates for the physical ethernet port 902 that is placed at the at least one BRH 322 and a physical ethernet port 1004. In some embodiments, the at least one Broadcast Radio Head (BRH) 322 includes an RF sniffing functionality that monitors radio environment that includes neighbor cell information, unwanted interferers, and cellular network congestion. In some embodiments, a self-interference cancelling mechanism is added to (i) find in-band interfering signals and (ii) prevent a receiver desensitization that improves a receiver dynamic range so that weak signals may be measured in presence of a strong broadcast signal. The logical "layer 2 (L2)" switch distributed 1000 includes a set of logical ethernet ports 1006 and 1008 for broadcast and unicast. In some embodiments, the physical ethernet port 1004 of the L2-tunnel from BO-GW 406 is connected to the physical ethernet port 902 of the at least one BRH 322 through a physical cable 1010.

Figure 11:
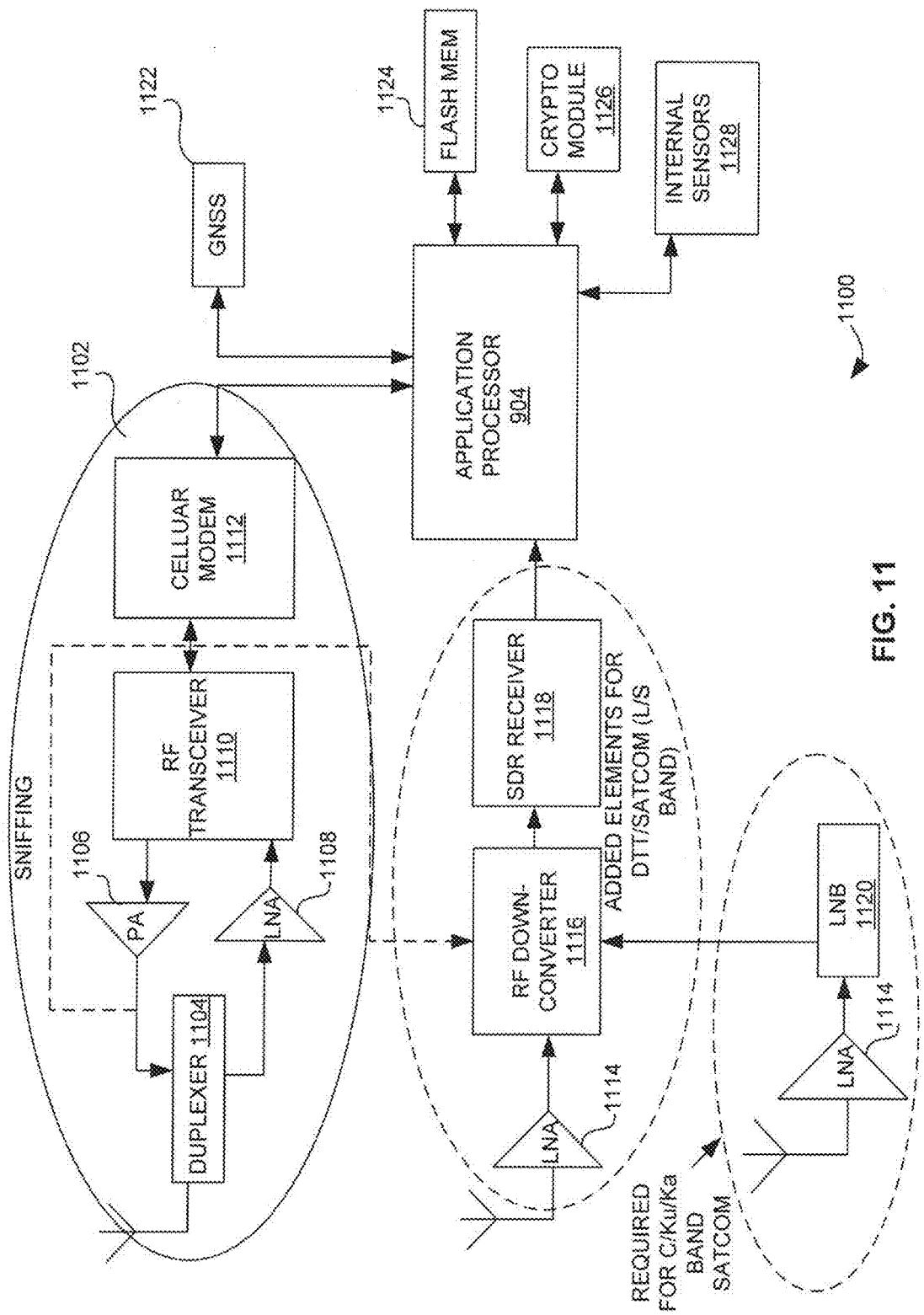
FIG. 11 is a block diagram that illustrates the converged UE that exploits a converged network according to some embodiments herein.

FIG. 11 is a block diagram 1100 that illustrates the converged UE 204 that exploits a converged network according to some embodiments herein. In some embodiments, the converged UE 204 without limitation, may be selected from a mobile phone, a Personal Digital Assistant (PDA), a tablet, a desktop computer, a laptop CPE or Vehicle mounted device. The block diagram 1100 includes the application processor 904, a RF sniffing 1102, a GNSS 1122, a flash memory 1124, a crypto module 1126, and internal sensors 1128. The RF sniffing 1102 includes a duplexer 1104, a PA 1106, a LNA 1108, a radio frequency transceiver 1110, and a cellular modem 1112. The converged UE 204 includes an SDR receiver 1118 which is a broadcast-based receiver. The SDR receiver 1118 receives a signal form a RF down converter 1116. The SDR receiver 1118 is considered to take care of different standards for a Digital terrestrial television (DTT) and configurations of the Digital terrestrial television (DTT). In some embodiments, the SDR receiver 1118 may be used for receiving satellite signals. In some embodiments, the SDR receiver 1118 may offload any service from broadband to broadcast, except some peer to peer services such as voice calls and video calls. The SDR receiver 1118 monitors cellular signals. In some embodiments, an insight into network congestion in the cellular network is obtained by detecting frequency of a schedule request for transmitting a given chunk of data, and frequency of negative acknowledgements (NACK) for a cellular downlink signal request. In some embodiments, the network congestion information is communicated to the analytics engine 408. Determination of a location of the converged UE 204 plays an important part in a scheme of things proposed. So, the converged UE 204, on demand, sends its location in terms of cell-id, GNSS 1112 coordinates, an inertial navigation for interpolating position using the internal sensors 1128 such as accelerometers, gyroscopes and anisotropic magnetic sensors from last the GNSS 1122 fix with good dilution of precision. In some embodiments, a received broadcast signal strength and quality is also measured. The converged UE 204 may send time stamped to the analytics engine 408 when requested by the analytics engine 408 so as to optimize a best modulation and coding for the converged UE 204 for a particular location and traffic. The crypto module 1126 generates and stores device identity corresponding to the unidirectional downlink network. The RF sniffing 1102 includes all the basic components for accessing any cellular connectivity.

Figure 12:
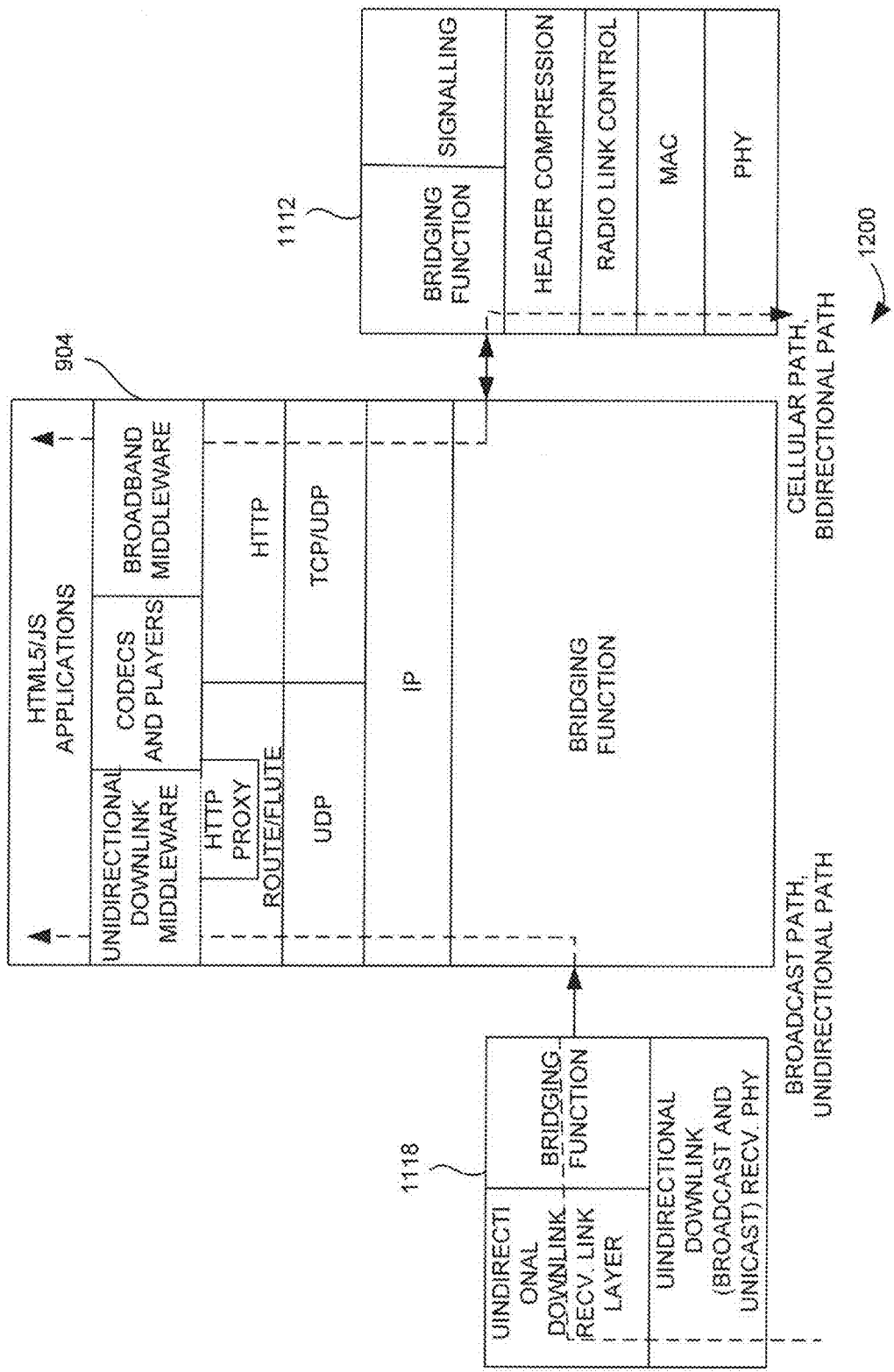
FIG. 12 illustrates a protocol stack running in the converged UE according to some embodiments herein.

FIG. 12 illustrates a protocol stack 1200 running in the converged UE 204 according to some embodiments herein. The protocol stack 1200 running in the converged UE 204 includes the application processor 904, the SDR receiver 1118, and the cellular modem 1112. In the cellular modem 1112, lower layers of the protocol stack, till a IP layer corresponding to the cellular/Wi-Fi standard is processed. In the SDR receiver 1118, a physical and a link layer functions are implemented. In some embodiments, the link layer function is implemented in the application processor 904. Higher layer functions (transport layer and above) are implemented in the application processor 904. A bridging function in the figure transfers data from the SDR receiver 1118 for a unidirectional link. In some embodiments, the SDR receiver 1118 includes an additional bridging function for to and for movement of cellular data from the application processor 904 and the cellular modem 1112. In some embodiments, a supplementary downlink channel and a cellular downlink channel use a same IP address. Broadcast data or unicast unidirectional data, received at the converged UE 204 through broadcast specific file delivery protocols such as "File Delivery over Unidirectional Transport (FLUTE)" or "Real Time Object Delivery over Unidirectional Transport (ROUTE)", is delivered to applications using a Layer 4 (L4) proxy. In some embodiments, data is delivered over standard transport protocols such as TCP and presented to application as HTTP payload. The Layer 4 (L4) proxy takes care of presenting the data received over these varied Layer 2 (L2) transports in a unified manner to application in order to optimize the link utilization.

Figure 13:
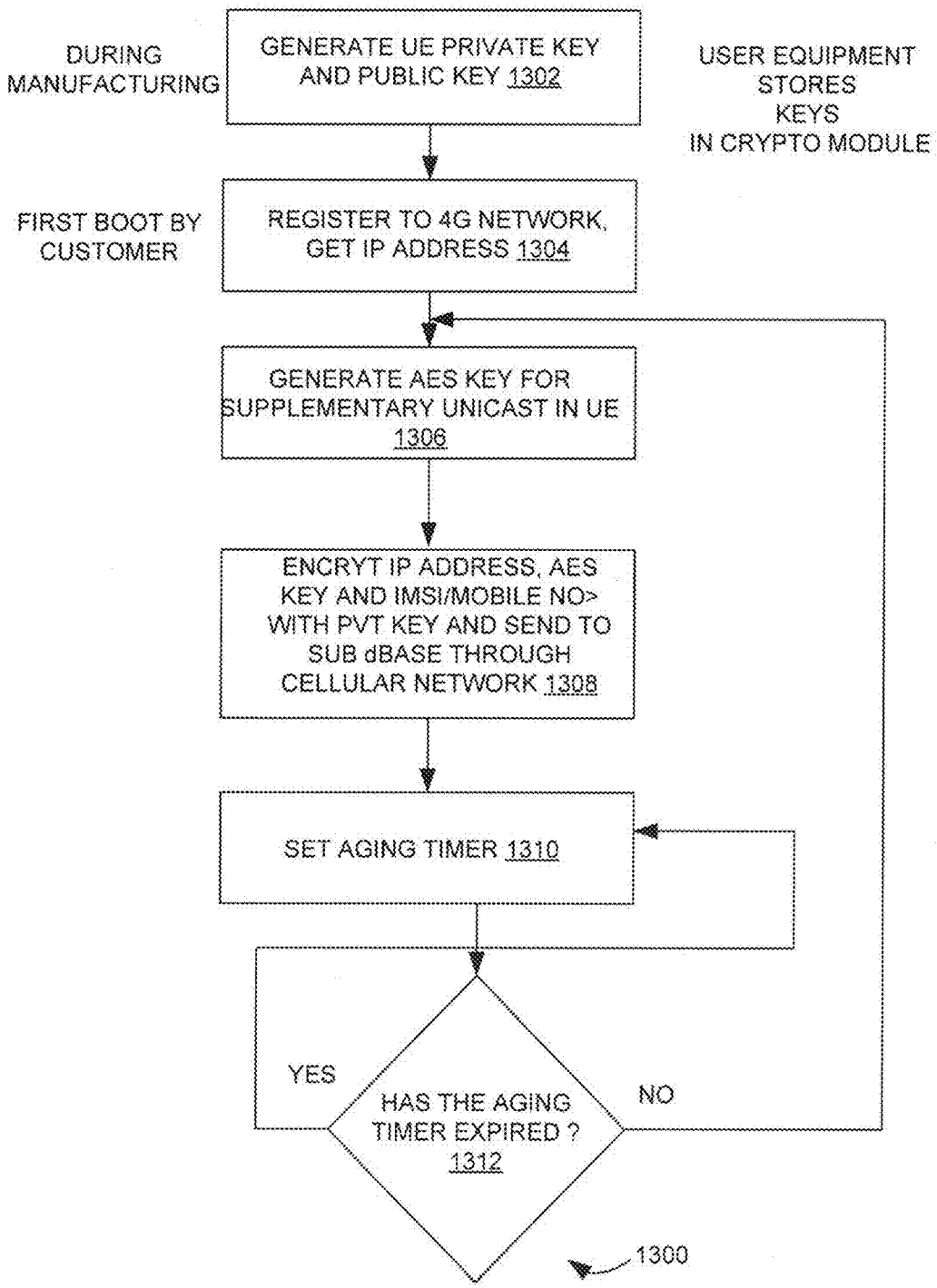
FIG. 13 is a flowchart that illustrates a method for on-boarding process of the converged UE on to a converged core network according to some embodiments herein.

FIG. 13 is a flowchart that illustrates a method 1300 for on-boarding process of the converged UE 204 on to a converged core network according to some embodiments herein. At step 1302, the on-boarding process 1300 includes internally generates public keys and private keys and shares private keys to the converged UE 204. In some embodiments, a private key that remains in inside of a secure vault and the private key is not exposed to the outside world (not even to the application processor 904). In some embodiments, a public key that is extracted out and the public key is entered by an automated mechanism inside the Subscriber Database shown in FIG. 4A. At step 1304, the on-boarding process 1300 includes authenticating and registering the converged UE 204 to the cellular network which culminates with the converged UE 204 getting its IP address when the converged UE 204 boots up by a user. At step 1304, the on-boarding process 1300 includes generates and adds a symmetric key such as AES key to a message and encrypting the symmetric key with the private key. In some embodiments, the IP address along with an "International Mobile Subscriber Identity (IMSI)" is communicated to a subscriber database server through the load manager 202. In some embodiments, the Subscriber Database 404 identifies the user based on the IMSI number and selects the public key to extract the symmetric AES key. At step 1308, the on-boarding process 1300 includes encrypts all the unicast traffic passing through a supplementary downlink. For the broadcast traffic, a common key may be used for all the subscriber UEs. So traditional key exchange methods used in such networks are reused. At step 1310, the on-boarding process 1300 includes sets an aging timer to enhance the security process, the symmetric key has a finite lifetime, as defined by the aging timer. At step 1312, the on-boarding process 1300 checks if the aging timer is expired or not, if yes, a new symmetric key may be generated by the converged UE 204 and notified to the subscriber database 404 through the cellular network else goes to step 1310. In some embodiments, the converged core network uses frameworks such as ONAP, which incorporates technologies such as NFV and SDN to implement core network components. In some embodiments, use of technologies that are aligned with those which are touted to play an important role in future 5G core networks, which include multicore server class CPUs, packet forwarding engines supporting network slicing etc.

Figure 14:
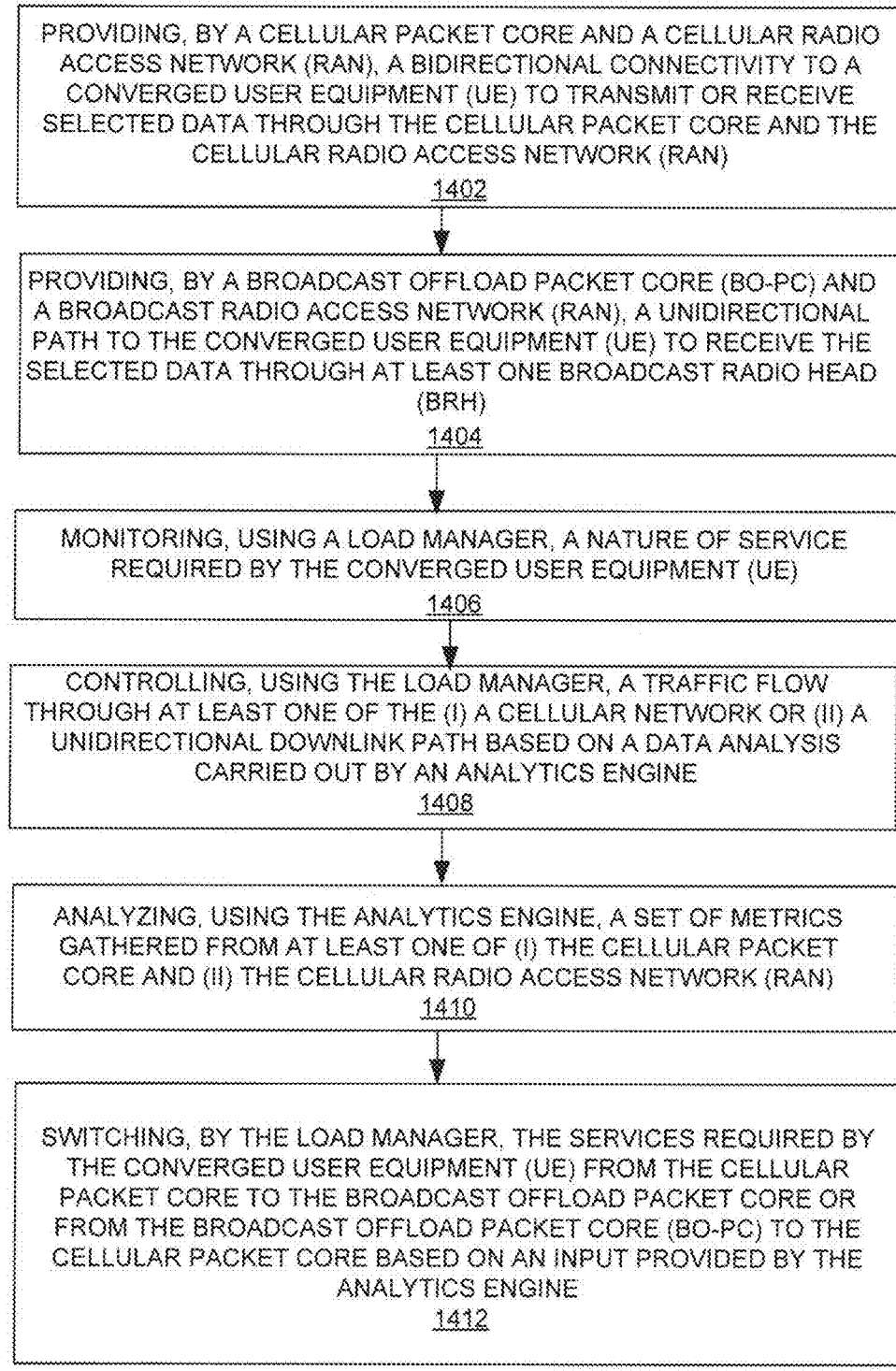
FIG. 14 is a flow diagram that illustrates a method for dynamically switching transmission of selected data from a cellular core network to a unidirectional point-to-multipoint downlink network based on a traffic flow analysis according to some embodiments herein.

FIG. 14 is a flow diagram that illustrates a method 1400 for dynamically switching transmission of selected data from the cellular core network 206 to a unidirectional point-to-multipoint downlink network or from the unidirectional point-to-multipoint downlink network to the cellular core network based on a traffic flow analysis according to some embodiments herein. At step 1402, the method 1400 includes providing, by the cellular packet core 206 and the cellular radio access network (RAN) 412, a bidirectional connectivity to the converged user equipment (UE) 204 to transmit or receive the selected data through the cellular packet core 206 and the cellular radio access network (RAN) 412. At step 1404, the method 1400 includes providing, by the Broadcast offload packet core (BO-PC) 302 and a broadcast radio access network (RAN), a unidirectional path to the converged UE 204 to receive the selected data through the at least one Broadcast Radio Head (BRH) 322. The Broadcast offload packet core (BO-PC) 302 includes the analytics engine 408. The analytics engine 408 is configured to gather a traffic flow data from at least one of (i) the cellular packet core 206, or (ii) the converged UE 204. The at least one Broadcast Radio Head (BRH) 322 configured to transmit the selected data from the broadcast radio access network (RAN) to the converged user equipment (UE) 204.

At step 1406, the method 1400 includes monitoring, using the load manager 202 a nature of service required by the converged UE 204. At step 1408, the method 1400 includes controlling, using the load manager 202 a traffic flow through at least one of the (i) the cellular network or (ii) the unidirectional downlink path based on a data analysis carried out by the analytics engine 408. At step 1410, the method 1400 includes analyzing, using the analytics engine 408, a set of metrics gathered from at least one of (i) the cellular packet core 206, or (ii) the cellular radio access network (RAN) 412. At step 1412, the method 1400 includes switching, by the load manager 202, the services required by the converged UE 204 from the cellular packet core 206 to the broadcast offload packet core 302 or from the broadcast offload packet core 302 to the cellular packet core 206 based on an input provided by the analytics engine 408. The load manager 202 decides whether to switch the transmission of the selected data from at least one of (i) a downlink traffic of the cellular packet core 206 to a unidirectional downlink of the BO-PC 302 or (ii) the unidirectional downlink of the BO-PC 302 to the downlink traffic of the cellular packet core 206 based on an analysis result suggested by the analytics engine 408.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for dynamically switching transmission of selected data from a cellular core network to a unidirectional point-to-multipoint downlink network or from the unidirectional point-to-multipoint downlink network to the cellular core network based on an analysis result, the system comprising:
 a cellular packet core that controls a cellular radio access network (RAN) for providing a bidirectional connectivity to a converged user equipment (UE) to transmit or receive the selected data through the cellular packet core and the cellular radio access network (RAN);
 a Broadcast offload packet core (BO-PC) that controls a broadcast radio access network (RAN), wherein the broadcast radio access network (RAN) comprises at least one Broadcast Radio Head (BRH) for providing a unidirectional downlink path to the converged user equipment (UE) to receive the selected data through the at least one Broadcast Radio Head (BRH), wherein the Broadcast Offload-Packet Core (BO-PC) comprises an analytics engine that is configured to
  gather traffic flow data from at least one of (i) the cellular packet core, or (ii) the converged user equipment (UE) to generate an input; and
  gather a set of metrics from at least one of (i) the cellular packet core, or (ii) the cellular radio access network (RAN) to generate the analysis result by analyzing the set of metrics;
 a load manager that is configured to
  monitor a nature of service required by the converged user equipment (UE)
  controls the traffic flow through at least one of the (i) a cellular network or (ii) the unidirectional downlink path based on the analysis result generated by the analytics engine,
  switch services required by the converged user equipment (UE) from the cellular packet core to the broadcast offload packet core or from the broadcast offload packet core to the cellular packet core based on the input provided by the analytics engine, and
  decide whether to dynamically switch the transmission of the selected data from at least one of (i) a downlink traffic of the cellular packet core to a downlink of the Broadcast Offload Packet Core (BO-PC) or (ii) the unidirectional downlink of the Broadcast Offload Packet Core (BO-PC) to the downlink traffic of the cellular packet core based on the analysis result generated suggested by the analytics engine.

2. The system of claim 1, wherein the broadcast offload packet core (BO-PC) comprises a Subscriber (SUBS) database, a Broadcast Offload Service Center (BO-SC), and a Broadcast Offload Gateway (BO-GW), wherein the Subscriber (SUBS) database comprises a user information that is determined by an unique identity of the converged user equipment (UE) to extract the selected data from the traffic flow data between the cellular packet core and the converged user equipment (UE).

3. The system of claim 2, wherein the Broadcast Offload Service Center (BO-SC) schedules the traffic flow to be transmitted over the unidirectional downlink for all BRHs under the Broadcast Offload Service Center (BO-SC) control, wherein the Broadcast Offload Service Center (BO-SC) performs Robust Header Compression (RoHC), and a data encryption on a per stream basis of the selected data.

4. The system of claim 2, wherein the Broadcast Offload Gateway (BO-GW) is configured to interface to a legacy IP Backhaul network to connect all the Broadcast Radio Heads (BRHs) through unicast link or multicast link, wherein the Broadcast Offload Gateway (BO-GW) tunnels header compressed IP packets over the legacy IP backhaul network destined to a target Broadcast Radio Head (BRH), wherein the legacy IP Backhaul network is configured from an Element Management System (EMS).

5. The system of claim 2, wherein the legacy IP backhaul network connects at least one of (i) cellular base stations, (ii) the at least one broadcast radio head (BRH), or (iii) a satellite head-end.

6. The system of claim 5, wherein the legacy IP Backhaul network provides a "Layer 2 Virtual Private Network (L2-VPN)" service to broadcast traffic and a L2 Tunnel service for a unicast traffic, wherein L2 tunnels are semi-permanent point-to-point paths that are created between the BO-GW and individual Broadcast Radio Heads (BRHs).

7. The system of claim 1, wherein if a new IP stream is added to the broadcast network, the at least one BRH initiates an "Internet Group Management Protocol (IGMP)" request, wherein the legacy IP Backhaul network adds the new IP stream to multicast within the L2-VPN using IGMP snooping.

8. The system of claim 7, wherein the BO-GW look-ups for an address of the L2 tunnels and VLAN tag and forwards a frame to a corresponding L2 tunnel or L2 VPN based on a destination IP address of the at least one BRH.

9. The system of claim 1, wherein the at least one Broadcast Radio Head (BRH) or a plurality of Broadcast Radio Heads (BRHs) caters to a broadcast traffic by operating as a single frequency network (SFN) or a multi frequency network (MFN) and caters to unicast traffic by operating as a supplementary downlink (SDL), wherein a network architecture that changes from the single frequency network (SFN) or the multifrequency network (MFN) or the supplementary downlink is based on a set of conditions that is decided by the analytics engine.

10. The system of claim 1, wherein the at least one Broadcast Radio Head (BRH) comprises an RF sniffing functionality that monitors radio environment that comprises neighbor cell information, unwanted interferers, and cellular network congestion.

11. The system of claim 1, comprising a satellite link that acts as a backhaul link for the at least one Broadcast Radio Head (BRH).

12. The system of claim 1, wherein the converged user equipment (UE) comprises at least one of (i) a broadcast receiver, or (ii) a satellite receiver to receive a unidirectional downlink signal, and a generic cellular modem functionality.

13. The system of claim 1, wherein the set of metrics comprises (i) a traffic flow rate, (ii) a level of congestion in the cellular packet core and the cellular radio access network (RAN), (iii) throughput of a cellular connectivity, (iv) packet jitter, (v) channel occupancy in the unidirectional downlink, and (vi) pre-decided policy metrics.

14. The system of claim 13, wherein the level of congestion is estimated from sizes of transmit buffer queues in a cellular base station obtained from at least one of (i) an Element Management System (EMS) that controls and monitors the cellular base stations or (ii) indirectly derived from the converged user equipment (UE) by measuring an elapsed time between a first scheduling request and an actual data transfer.

15. The system of claim 14, wherein the converged user equipment (UE) is capable of estimating a traffic intensity at a geographical region by performing measurements of the elapsed time between the first scheduling request and the actual data transfer in a cellular modem.

16. The system of claim 1, wherein the load manager generates a "table of contents" for broadcast streams and is made available to the converged UE, wherein if the converged UE identifies a desired content in the "table of contents", the converged UE starts consuming the desired content and notifies the consumed content to the load manager over a cellular uplink, wherein the analytics engine and a Content Distribution Network (CDN) are made aware of consumption and add information of the consumed content to a database.

17. The system of claim 1, wherein the converged UE comprises an SDR receiver that monitors cellular signals, wherein an insight into network congestion in the cellular network is obtained by detecting frequency of a schedule request for transmitting a given chunk of data, and frequency of negative acknowledgements (NACK) for a cellular downlink signal request, wherein network congestion information is communicated to the analytics engine.

18. The system of claim 1, wherein the Broadcast Offload Packet Core (BO-PC) interfaces with a Gateway Mobile Location Centre (GMLC) to obtain a location information of the converged user equipment (UE) to provide a handoff mechanism when the unidirectional downlink is used for a unicast traffic.

19. The system of claim 1, wherein the analytics engine comprises a radio environment database, wherein the radio environment database comprises a data on a geographical location, latitude, longitude, and various radio frequency RF parameters, wherein the various radio frequency RF parameters comprise reference signal levels, noise and interference levels, traffic patterns, which quantifies coverage and a quality of service at given locations.

20. The system of claim 1, wherein the analytics engine performs traffic pattern analysis on the traffic flow data and determines the traffic flow that is suitable to be sent over the unidirectional downlink or the cellular network.

21. The system of claim 1, wherein the analytics engine selects contents and streams to be sent via the unidirectional downlink as a unicast or multicast or a broadcast mode of delivery.

22. The system of claim 1, wherein the load manager comprises a number of dynamic threads, wherein the load manager is configured to
poll for user sessions and analyze each user session to determine whether a user session is a new user session or an existing user session,
generate a thread on addition of the new user session originating from at least one converged user equipment (UE), and
determine whether the existing user session is terminated, wherein if the existing user session is terminated then kill threads corresponding to terminated user sessions to free up computational and storage resources.

23. The system of claim 22, wherein the load manager generates a thread for a session, wherein the load manager
queries a location of the converged UE for a session specific thread;
queries the analytics engine to determine best means to connect in a downlink;
determines if the traffic is scheduled on cellular or unidirectional downlink;
performs a deep inspection of RTP timestamps to measure latency and jitter in the cellular network; and
configures the BO-SC for the broadcast or the unicast and initiates switch over to the unidirectional downlink.

24. The system of claim 1, wherein the load manager interacts with a Content Distribution Network or a Content Delivery Network (CDN) to pull or push a content.

25. The system of claim 1, wherein the Broadcast Offload Packet Core (BO-PC) is a part of 2G, 3G, WiFi, 4G, and 5G networks.

26. The system of claim 1, wherein the at least one Broadcast Radio Head (BRH) dynamically switches from a single frequency network (SFN) to a multiple frequency network (MFN) or from the multiple frequency network (MFN) to the single frequency network (SFN) based on a demographic distribution.

27. The system of claim 1, wherein the at least one Broadcast Radio Head (BRH) in a first region is configured to operate in a Single Frequency Network (SFN) or Multi Frequency Network (MFN) mode and the at least one Broadcast Radio Head (BRH) in a second region is configured to concurrently operate in a unicast mode, based on a decision determined by the load manager and the analytics engine.

28. The system of claim 1, wherein the converged user equipment (UE) is an enhanced user equipment that is configured to receive contents from at least one of (i) the cellular network and (ii) the unidirectional downlink path through the Broadcast Offload Packet Core (BO-PC).

29. The system of claim 1, wherein the at least one Broadcast Radio Head (BRH) configured to transmit the selected data from the broadcast radio access network (RAN) to the converged user equipment (UE).

30. A method for dynamically switching transmission of selected data from a cellular core network to a unidirectional point-to-multipoint downlink network or from the unidirectional point-to-multipoint downlink network to the cellular core network based on an analysis result, the method comprising:
providing, by a cellular packet core and a cellular radio access network (RAN), a bidirectional connectivity to a converged user equipment (UE) to transmit or receive the selected data through the cellular packet core and the cellular radio access network (RAN);
providing, by a Broadcast offload packet core (BO-PC) and a broadcast radio access network (RAN), a unidirectional path to the converged user equipment (UE) to receive the selected data through at least one Broadcast Radio Head (BRH), wherein the Broadcast offload packet core (BO-PC) comprises an analytics engine, wherein the analytics engine is configured to
gather a traffic flow data from at least one of (i) the cellular packet core, or (ii) the converged user equipment (UE) to generate an input;
gather a set of metrics from at least one of (i) the cellular packet core, or (ii) the cellular radio access network (RAN) to generate the analysis result by analyzing the set of metrics;
monitoring, using a load manager, a nature of service required by the converged user equipment (UE);
controlling, using the load manager, a traffic flow through at least one of the (i) the cellular network or (ii) the unidirectional downlink path based on the analysis result generated by the analytics engine;
switching, using the load manager, the services required by the converged user equipment (UE) from the cellular packet core to the broadcast offload packet core or from the broadcast offload packet core to the cellular packet core based on the input provided by the analytics engine; and
deciding, using the load manager, whether to dynamically switch the transmission of the selected data from at least one of (i) a downlink traffic of the cellular packet core to a downlink of the Broadcast Offload Packet Core (BO-PC) or (ii) the unidirectional downlink of the broadcast offload packet core to the downlink traffic of the cellular packet core based on the analysis result generated by the analytics engine.

31. The method of claim 30, wherein the method comprises interfacing the broadcast offload packet core (BO-PC) with a Gateway Mobile Location Centre (GMLC) to obtain location information of the converged user equipment (UE) to provide a handoff mechanism when the unidirectional downlink is used for a unicast traffic.

32. The method of claim 30, wherein the method comprises estimating a level of congestion from sizes of transmit buffer queues in a cellular base station obtained from at least one of (i) an Element Management System (EMS) that controls and monitors the cellular base stations or (ii) indirectly inferred from the converged user equipment (UE) by measuring an elapsed time between a first scheduling request and an actual data transfer.

* * * * *